United States Patent
Puleo et al.

(10) Patent No.: US 12,527,977 B2
(45) Date of Patent: Jan. 20, 2026

(54) COMBINED NEUROMODULATION TECHNIQUES

(71) Applicant: GE Precision Healthcare LLC, Waukesha, WI (US)

(72) Inventors: Christopher Michael Puleo, Niskayuna, NY (US); Victoria Eugenia Cotero, Troy, NY (US); Jeffrey Michael Ashe, Gloversville, NY (US)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 152 days.

(21) Appl. No.: 18/264,316

(22) PCT Filed: Jan. 31, 2022

(86) PCT No.: PCT/US2022/014585
§ 371 (c)(1),
(2) Date: Aug. 4, 2023

(87) PCT Pub. No.: WO2022/169712
PCT Pub. Date: Aug. 11, 2022

(65) Prior Publication Data
US 2024/0316368 A1   Sep. 26, 2024

Related U.S. Application Data

(60) Provisional application No. 63/145,664, filed on Feb. 4, 2021.

(51) Int. Cl.
*A61N 7/02* (2006.01)
*A61N 7/00* (2006.01)

(52) U.S. Cl.
CPC ........ *A61N 7/02* (2013.01); *A61N 2007/0026* (2013.01)

(58) Field of Classification Search
CPC .... A61N 7/02; A61N 2007/0026; A61N 7/00; A61B 5/14532; A61B 5/4839
See application file for complete search history.

(56) References Cited

U.S. PATENT DOCUMENTS

| | | | |
|---|---|---|---|
| 2011/0257561 A1 | 10/2011 | Gertner et al. | |
| 2014/0074076 A1* | 3/2014 | Gertner | A61B 6/12 606/169 |
| 2016/0236012 A1* | 8/2016 | Zderic | A61B 5/4836 |
| 2018/0333574 A1* | 11/2018 | Pal | A61N 1/0476 |

(Continued)

FOREIGN PATENT DOCUMENTS

| | | | | |
|---|---|---|---|---|
| JP | 2014239918 A | 12/2014 | | |
| WO | WO-2018081826 A1 * | 5/2018 | ........... | A61B 5/6825 |

OTHER PUBLICATIONS

EP application 22750222.6 filed Jul. 31, 2023—extended Search Report issued Nov. 27, 2024; 10 pages.

(Continued)

*Primary Examiner* — Bo Joseph Peng
(74) *Attorney, Agent, or Firm* — Fletcher Yoder, P.C.

(57) ABSTRACT

Combined neuromodulation techniques are disclosed to treat metabolic disorders. The combined neuromodulation techniques may include dual-site neuromodulation or single-site neuromodulation. In embodiments, the neuromodulation may be administered as a combined therapy with a pharmaceutical treatment.

24 Claims, 18 Drawing Sheets

(56) References Cited

U.S. PATENT DOCUMENTS

2019/0388132 A1 12/2019 Azamian et al.
2020/0346043 A1 11/2020 Puleo
2020/0406066 A1 12/2020 Puleo et al.

OTHER PUBLICATIONS

Cotero, V, et al.; "Peripheral Focused Ultrasound Neuromodulation (pFUS)," Journal of Neuroscience Methods, vol. 341, Article No. 108721, May 6, 2020, pp. 1-10.
International Search Report and Written Opinion for PCT Application No. PCT/US2022/014585, mailed May 16, 2022, 14 pgs.

* cited by examiner

COMBINED NEUROMODULATION TECHNIQUES

BACKGROUND

The subject matter disclosed herein relates to neuromodulation and more specifically, to techniques using combined neuromodulation treatments including energy applied from an energy source and/or neuromodulation used in conjunction with a pharmaceutical treatment.

Neuromodulation has been used to treat a variety of clinical conditions. For example, electrical stimulation at various locations along the spinal cord has been used to treat chronic back pain. Such treatment may be performed by an implantable device that periodically generates electrical energy that is applied to a tissue to activate certain nerve fibers, which in turn may result in a decreased sensation of pain. In the case of spinal cord stimulation, the stimulating electrodes are generally positioned in the epidural space, although the pulse generator may be positioned somewhat remotely from the electrodes, e.g., in the abdominal or gluteal region, but connected to the electrodes via conducting wires. Electrodes that are positioned at or near certain target nerves mediate neuromodulation by triggering an action potential in the nerve fibers, which in turn results in neurotransmitter release at a nerve synapse and synaptic communication with the next nerve. Such propagation may result in a relatively larger or more diffuse physiological effect than desired, as current implementation of implanted electrodes stimulate many nerves or axons at once. Because the neural pathways are complex and interconnected, a more targeted modulated effect may be more clinically useful.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
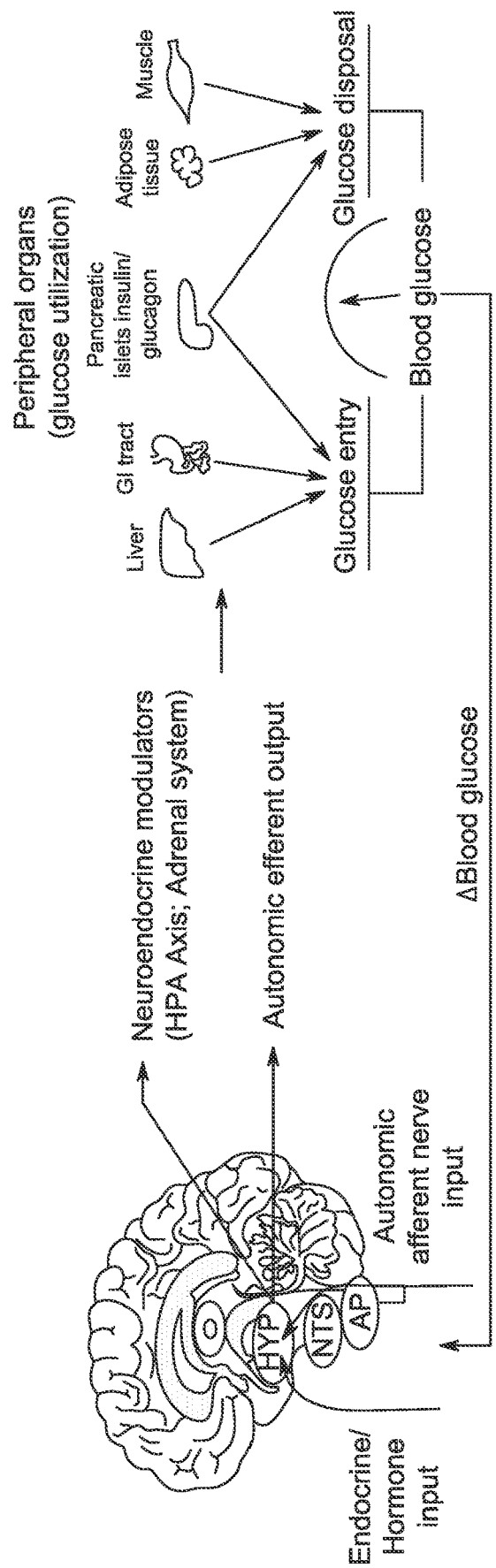
FIG. 1 is a schematic illustration of a hypothalamic metabolic control center and its role in integration of hormonal/endocrine and neuronal/afferent sensory information on glucose and nutrient availability according to embodiments of the disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Any examples or illustrations given herein are not to be regarded in any way as restrictions on, limits to, or express definitions of, any term or terms with which they are utilized. Instead, these examples or illustrations are to be regarded as being described with respect to various particular embodiments and as illustrative only. Those of ordinary skill in the art will appreciate that any term or terms with which these examples or illustrations are utilized will encompass other embodiments that may or may not be given therewith or elsewhere in the specification and all such embodiments are intended to be included within the scope of that term or terms. Language designating such non-limiting examples and illustrations includes, but is not limited to: "for example," "for instance," "such as," "e.g.," "including," "in certain embodiments", "in some embodiments", and "in one (an) embodiment."

Provided herein are combined neuromodulation techniques that include application of neuromodulating energy. The combined neuromodulation techniques cause targeted physiological outcomes (e.g., to treat, prevent, cure, or cause remission of a physiological condition) that are the result of the combined neuromodulation techniques. For example, combined neuromodulation techniques as provided herein may be used to boost or increase the effects of a pharmaceutical or other neuromodulating treatment and/or cause a patient previously resistant or less responsive to the treatment to become responsive. In an embodiment the combined neuromodulation technique includes a neuromodulation treatment at two or more different regions of interest to target different parts of a physiological control pathway. In an embodiment the combined neuromodulation technique includes a neuromodulation treatment targeted to at least one region of interest and at least one pharmaceutical treatment.

In embodiments of the combined techniques, neuromodulation at a first site (e.g., a first part of a combined neuromodulation technique) can be used to enhance a pharmaceutical treatment and/or enhance neuromodulation at a second or different site or different sites in the patient. Thus, the enhancement may permit modification of the pharmaceutical treatment or the combined neuromodulation dose to adjust the standard or recommended dose. In one example, less of the pharmaceutical treatment composition is administered to a patient to achieve a same clinical effect relative to the standard dose administered in the absence of the neuromodulation. Thus, the treatment may be less expensive as less of the treatment composition is administered. Further, the patient is exposed to lower doses of the pharmaceutical treatment, which may in turn reduce risk of side effects and permit certain drug regimens to be administered over longer time periods. In another example, the neuromodulating energy at one or more target sites can be adjusted (e.g., lowered) based on the enhancement of the combined treatment so that less neuromodulating energy is applied to a particular treatment target within a region of interest to achieve the desired physiological outcomes.

The enhancement may be bi-directional such that a first part of the combined neuromodulation technique enhances the clinical effects of a second part of the combined neuromodulation technique or vice versa. In an embodiment, the neuromodulation is provided to a patient also undergoing a pharmaceutical treatment to enhance one or both of the clinical effects of the pharmaceutical treatment or the effects of the neuromodulation. For example, the administration of the pharmaceutical treatment may activate or alter a presence or level of molecules or cells in the patient that are associated with a successful neuromodulation (e.g., a successful application of neuromodulating energy to a region of interest in a patient to cause a physiological effect). Thus, the pharmaceutical treatment can act to enhance neuromodulation or improve patient response to neuromodulation. Similarly, neuromodulation at one or both sites of a two-site treatment protocol may serve to enhance the clinical effects at the other site.

Ultrasound can stimulate peripheral nerve fields (both efferent and afferent nerve fields) in and around organs, including the spleen (activating nerves that modulate immune cells and immune system function) and the liver (activating nerves that modulate glucose/nutrient sensing and metabolic system function). Provided herein, in an embodiment, are techniques to improve the anti-diabetic effects of ultrasound treatment that result in an unexpected outcome of providing long-term remission of type II diabetes, even in a genetic Fatty Diabetic Zucker (ZDF) Rodent model. In an embodiment, the techniques include a dual stimulation treatment of the hypothalamic metabolic control center using both ultrasound neuromodulation of a sensory field (i.e. hepatic/hepatoportal plexus neuromodulation of the ascending glucose sensor afferent pathway) and ultrasound neuromodulation of a neuroendocrine field (i.e. stimulation of glucagon-like peptide (GLP) secretion and associated hormonal and afferent pathway) from the gastrointestinal tract. In an embodiment the combined neuromodulation technique includes ultrasound neuromodulation of a sensory field (i.e. hepatic/hepatoportal plexus neuromodulation of the ascending glucose sensor afferent pathway) and pharmaceutical activation of an endocrine target (i.e. liraglutide; GLP agonist). In an embodiment the combined neuromodulation technique includes targeting the superior mesenteric plexus, the inferior mesenteric plexus, and/or the fundus of the stomach as a target for neuromodulating energy.

The disclosed parts of the combined neuromodulation techniques may be administered contemporaneously or may involve time-separated administration of different parts of the combination. In one embodiment, different parts of the combination may be applied within 30 minutes of one another or within 60 minutes of one another. In one embodiment, different parts of the combination may be applied with at least a five minute separation. Provided herein are specific time points between dual-site stimulation that provide time-separated neuromodulation of the liver vs. GI tract that enables a synergistic dual-site effect; the disclosed timing that is designed to match the afferent signaling that would occur during feeding to obtain the unique results (i.e. long term diabetes remission) shown. Accordingly, as provided herein combined neuromodulation treatments may be aligned with glucose kinetics caused by the first energy application of the combined neuromodulation. In one embodiment, a second or subsequent treatment is applied or administered within a higher glucose period of the first 40 minutes-60 minutes. In one embodiment, a second or subsequent treatment is applied or administered within a reduced glucose period and after the first 40 minutes-60 minutes. The different parts of a combined neuromodulation may be part of a treatment administered together at a single patient visit.

It should be understood that the combined neuromodulation techniques may be part of a treatment regimen of a patient including multiple combined neuromodulations administered on different days, weeks, or months. The combined neuromodulations as disclosed herein may be modified or adjusted over the course of the treatment regimen based on patient progress or clinical condition. Adjustment may include adjusting energy application parameters and/or drug doses.

Unexpected effects of the combined neuromodulation techniques include long-term remission in diabetic animal models using the above two dual-modulation techniques. Further, ultrasound activation of a hepatic site (i.e. the hepatoportal nerve plexus) is demonstrated using a lower ultrasound power than previously demonstrated. This low power activation is achieved by stimulating the hepatic site over a longer duration/stimulus time than the previously described higher power activation/neuromodulation.

An embodiment of the disclosed combined neuromodulation techniques includes pharmaceutical treatments and neuromodulation techniques to treat a patient with a metabolic disorder. Certain embodiments of the disclosure are discussed in the context of blood glucose regulation. FIG. 1 is a schematic illustration of a hypothalamic metabolic control center and its role in integration of hormonal/endocrine and neuronal/afferent sensory information on glucose and nutrient availability. Specific nuclei within the hypothalamus function in maintaining glucose homeostasis, and may work in conjunction with effector tissues in the periphery (e.g. liver, intestines, muscle, pancreas) to mediate a whole body glucose "set point" (i.e., a target blood glucose concentration) based on sensory information. Furthermore, the importance of this area of the brain in integrating sensory information from both hormonal/endocrine and nerve/autonomic inputs is supported by the existence of cell/nerve population in this region that contain both hormone and neurotransmitter receptors and surveil both the hormonal and autonomic milieu via integration with circulating blood (at the median eminence of the hypothalamus and circumventricular organs) and direct and indirect connection to afferent peripheral sensory nerves.

Figure 2:
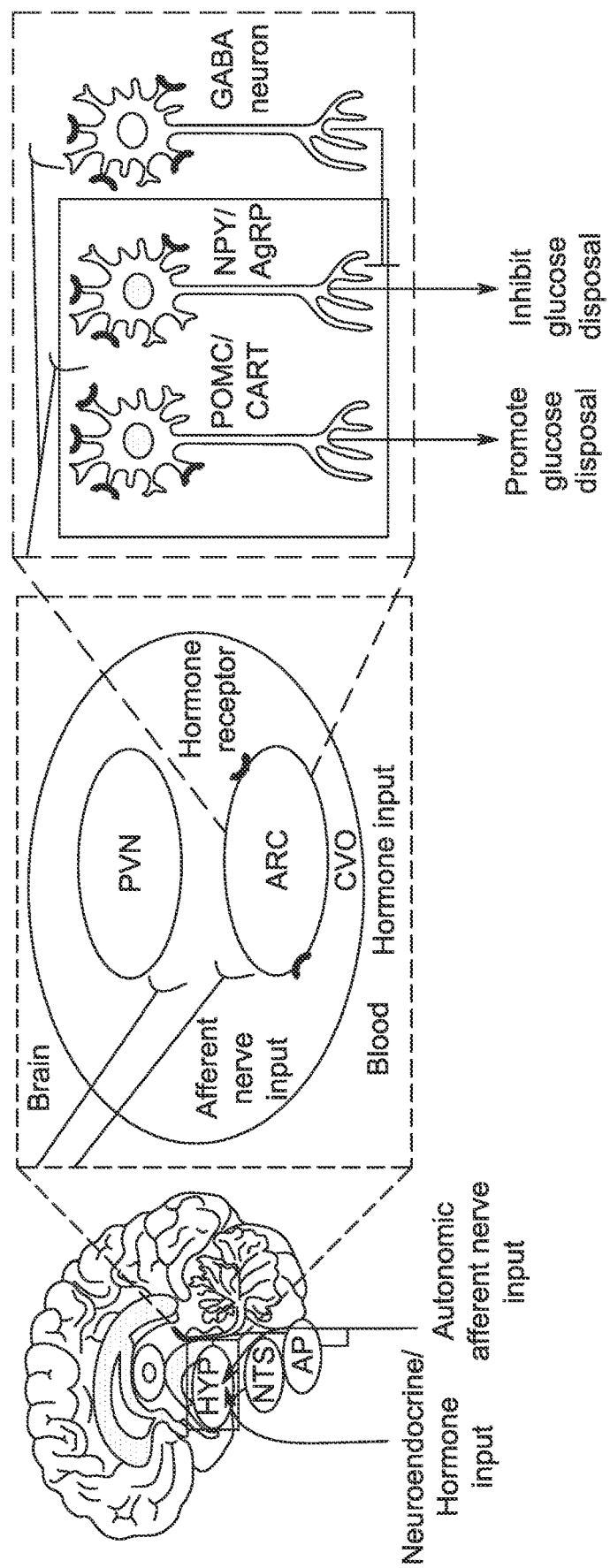
FIG. 2 is a schematic illustration of glucose-excited and glucose-inhibited neuronal populations in the hypothalamus according to embodiments of the disclosure.

FIG. 2 is a schematic illustration of glucose-excited and glucose-inhibited neuronal populations in the hypothalamus. Populations of sensory neurons that increase or decrease firing rates based on current glucose concentrations are components of the glucoregulatory system. Populations of cells within the arcuate nucleus (ARC) of the hypothalamus (i.e., the site that is located near the median eminence (access to blood) have incoming/afferent sensory neurons innervation (both direct and indirect from other nuclei) and have efferent output to major metabolic control centers such as the paraventricular nucleus (PVN). Two major populations of cells have opposing effects on metabolism in these area; POMC (pro-opiomelanocortin)/CART (cocaine- and amphetamine-regulated transcript) neurons which are associated with whole body anorexigenic outcomes (and appetite suppression/satiety), and NPY (neuropeptide Y)/AgRP (agouti-related peptide) neurons which are associated with orexigenic outcomes (and appetite stimulation). This neuron population has acute effects of glucose disposal vs. glucose uptake, as shown in FIG. 2. In addition, these neurons are also associated with an inhibitory GABA (Gamma aminobutyric acid) neurons, which serves as an inhibitory input to the NPY/AgRP side.

Figure 3A:
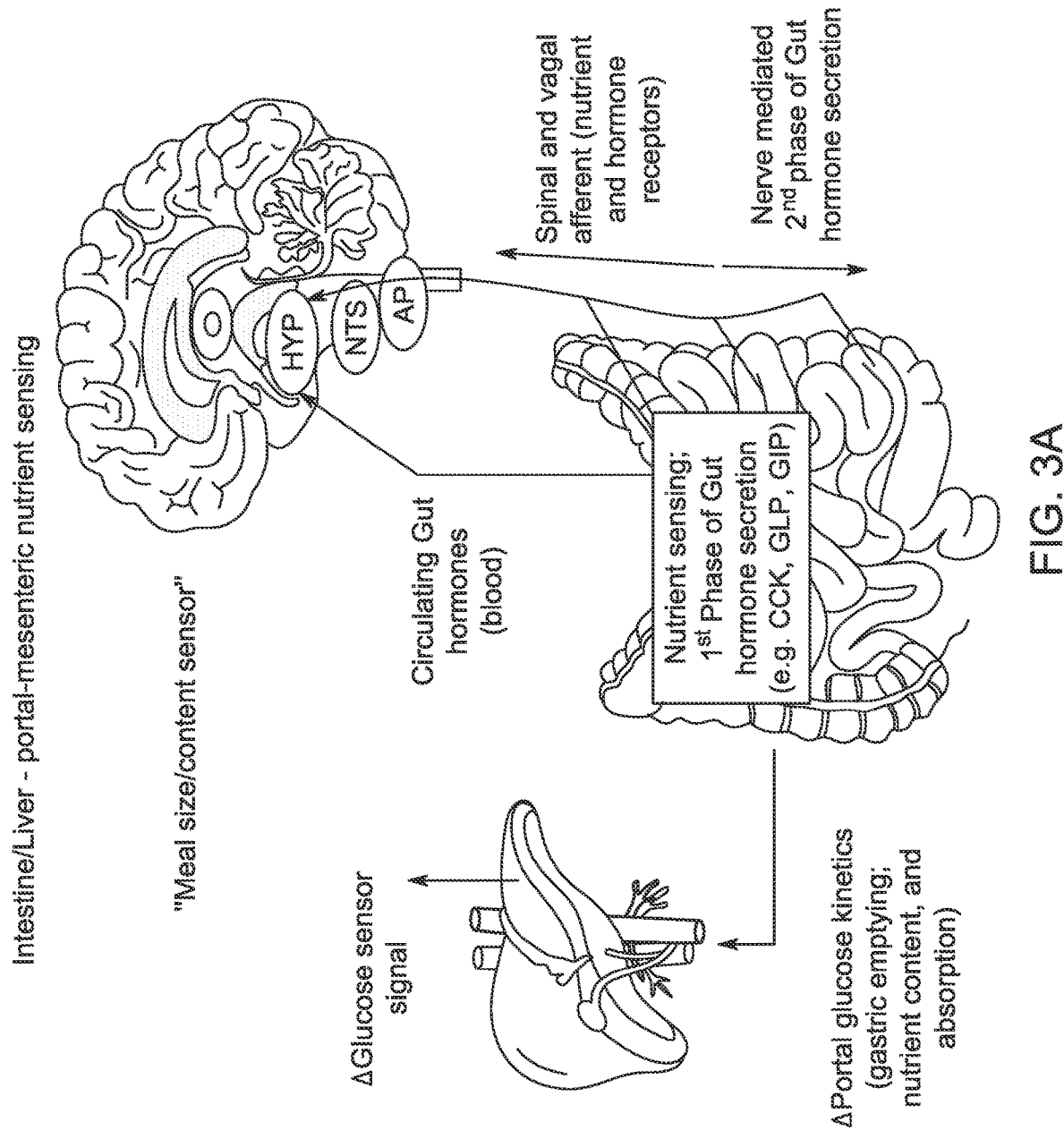
FIG. 3A is a schematic illustration of autonomic inputs to the hypothalamus from gut-liver-brain axis according to embodiments of the disclosure.
Figure 3B:
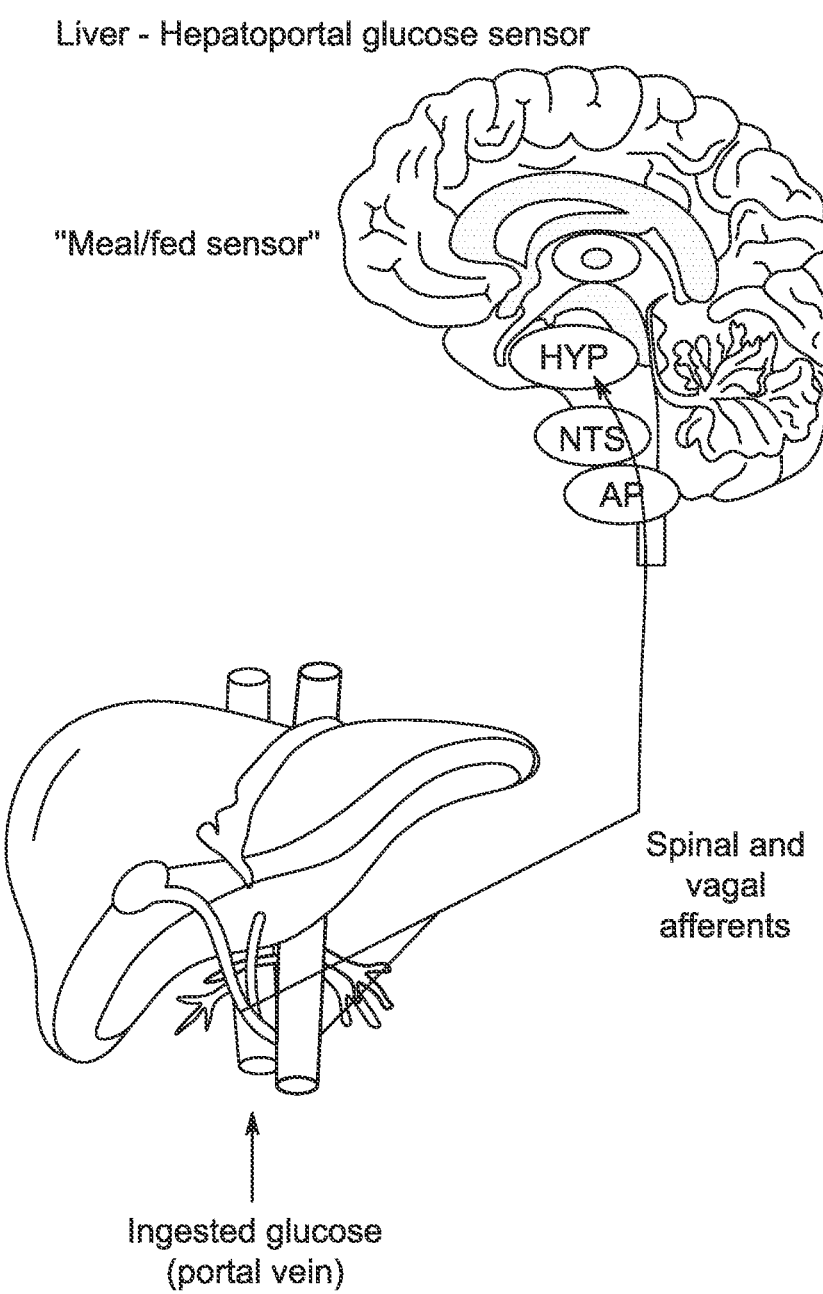
FIG. 3B is a schematic illustration of autonomic inputs to the hypothalamus from gut-liver-brain axis according to embodiments of the disclosure.

FIGS. 3A-3B show autonomic inputs to the hypothalamus from gut-liver-brain axis. FIG. 3A is a schematic illustration of intestine/liver portal-mesenteric nutrient sensing. The hepatoportal plexus contains a set of afferent neurons that communicate with the hypothalamus. These neurons are associated with the portal vein and hepatic artery and alter firing rates based on the gradient in glucose between the portal vs. peripheral blood supply to the liver (e.g., a meal would be associated with an increase in glucose from the blood coming from the intestines, or a higher glucose concentration in the portal vein versus the hepatic artery). Stimulation at this site and activation of these neurons has a profound effect on animal models of diabetes, e.g., under daily stimulation conditions.

However, as shown in FIG. 3B, the function of this hepatoportal plexus is dependent on more than just direct detection of "food" (i.e. glucose) within the portal vein. One interaction is with the intestinal incretin and autonomic sensory system. In addition to altering the firing rates of the hepatic glucose sensor, ingestions of food and the presence of nutrient within the gastrointestinal tract causes the secretion of incretins (and other hormones) from the cells lining the gastrointestinal tract wall. These hormones perform multiple functions: 1) alter gastric motility and emptying (which may alter the kinetics/duration of portal glucose sensor firing), 2) modulate the firing rate/signaling of gut hormone dependent sensory neurons within the gastrointestinal tract (these are also modulated by nutrient receptors and are known to project to hypothalamus), and 3) spill over into the circulation and alter hypothalamic function through the median eminence/circumventricular organs via blood rather than direct neuronal pathways.

Figure 4:
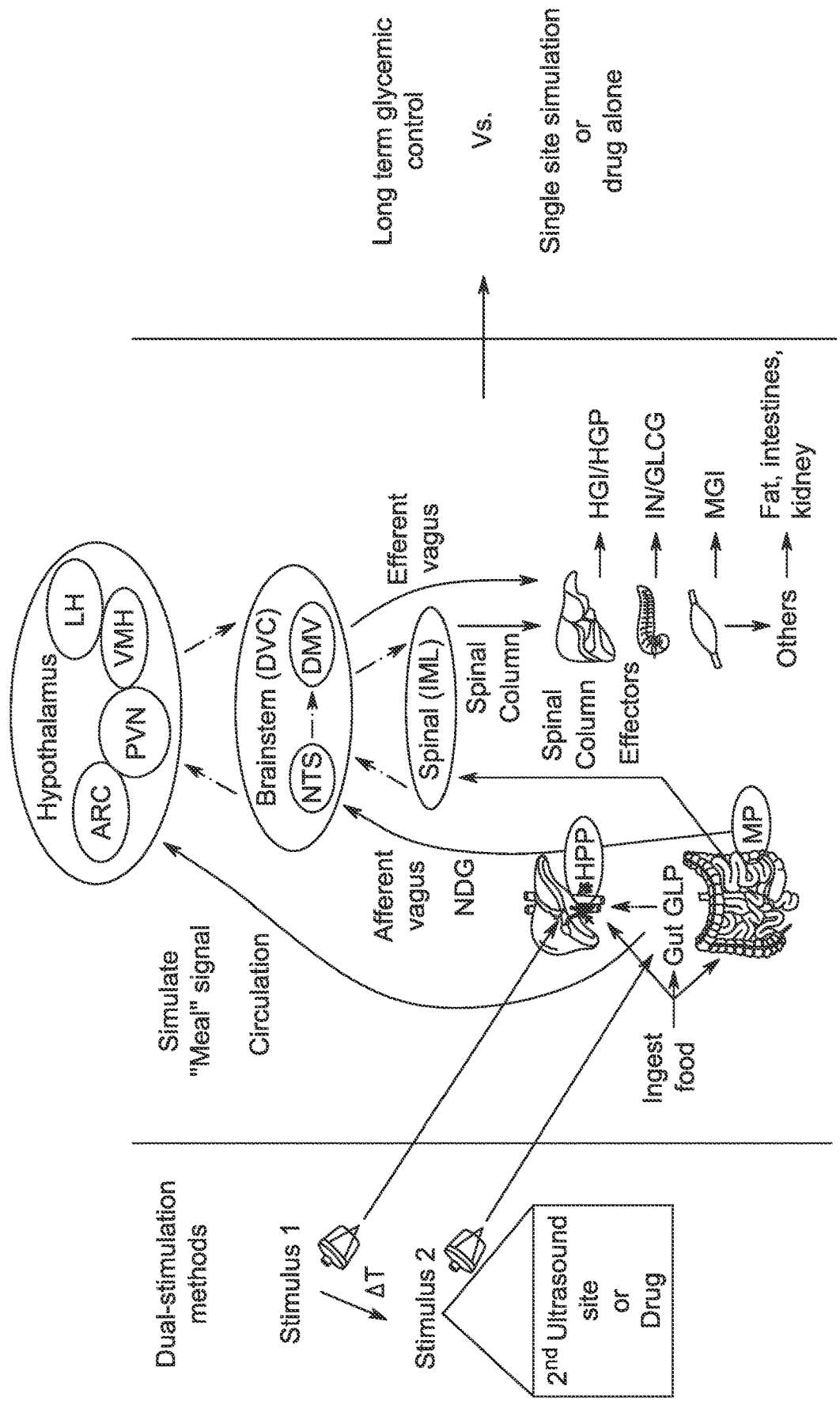
FIG. 4 is a schematic illustration of a combined neuromodulation technique using non-invasive ultrasound neuromodulation of the portal sensors combined with an additional stimulus to mimic fed state signaling and trigger glucose disposal according to embodiments of the disclosure.

FIG. 4 is a schematic illustration of combined neuromodulation techniques that include ultrasound neuromodulation of the portal sensors and an additional stimulus (which may be another ultrasound neuromodulation at a different target or a pharmaceutical treatment). Dual site or dual stimulation neuromodulation yields diabetes "remission" or long-term glycemic control even after stopping stimulation, which is an unexpected result of the present disclosed embodiments. There are multiple pathways that are activated upon feeding that trigger metabolic system changes (and are required for healthy gluco-regulation). As a non-invasive technology, the ultrasound neuromodulation technology as part of the combined neuromodulation can be used to stimulate or trigger multiple pathways. This can be done by stimulating two or more pathways with ultrasound (i.e. stimulation both the portahepatic and a gastrointestinal site as shown above), or by stimulation one pathway with the ultrasound stimulus (i.e. a neural therapy) in conjunction with a drug (i.e. a hormonal or receptor pathway). In addition, thus "dual-stimuli" can be timed or spaced out in order to mimic "natural" signaling during a fed state or meal.

EXAMPLES

The following section provides experimental parameters for aspects of the examples provided herein and experimental results.

Material and Methods 1.1-MHz Single-element Focused Ultrasound System

The 1.1 MHz single-element focused ultrasound system included of a signal 5 generator (Model 33120A, Agilent Technologies Inc., Santa Clara, CA), a RF power amplifier (Model 350L, Electronics & Innovation Ltd., Rochester, NY) and a 1.1 MHz focused single-element ultrasound transducer (Model H102, Sonic Concepts Inc., Bothell, WA). The transducer was connected to the output of the power amplifier using a matching network (Model H102, Sonic Concepts Inc., Bothell, WA). The transducer element was 64 mm in diameter and has a 63.2 mm 10 radius of curvature with a 20 mm diameter hole in the center into which a small imaging transducer can be inserted for image guidance. The transducer was acoustically coupled to the animal through a 6-cm tall plastic standoff cone filled with degassed water.

The nominal settings of the waveform are listed below:
Carrier Frequency—1.1 MHz
135 mV pk-to-pk signal generator Amplitude
150 micro-seconds Pulse Length
5 Hz Pulse Repetition Frequency
Max Negative Pressure=0.78 MPa
Stimulation time=3 minutes total duration (per anatomical site)
Pulse Average Intensity (Isppa)=23 W/cm^2
Temporal Average Intensity (Ispta)=6,263 mW/cm^2
MI=0.6
TI=0.7

The acoustic performance of the system was characterized at an ISO/IEC 17025:2017 accredited laboratory (Acertara Acoustic Labs, Longmont, CO). Under the above settings three separate 20 systems were characterized, producing a mechanical index, MI of 1.79 mean (+/−0.10 stdev), a derated peak negative pressure, pr.3 of 1.87 (+/−0.11) MPa, a derated spatial-peak pulse-average intensity, Isppa.3 of 125.7 (+/−15.0) W/cm2 and a derated spatial-peak temporal-average intensity, Ispta.3 of 94.3 (+/−11.2) mW/cm2. Good linearity (0.9947 R2) of MI was observed over an amplitude range from 100 mV pk-to-pk to 200 mV pk-to-pk therefore acoustic output 25 can reasonably be linearly extrapolated to other amplitudes, pulse durations and pulse repetition frequencies. The simulated pressure profile has a full width half maximum amplitude of 1.8 mm laterally and 6 mm in the depth direction using Field II120,121. The −6 dB diameters at the peak were measured to be 1.45 (+/−0.02) mm in the X scan axis and 1.46 (+/−0.02) mm in the Y scan axis at the accredited laboratory.

A Vivid E9 ultrasound system (GE Healthcare) or an 11L probe (GE Healthcare) were used for the ultrasound scan before neuromodulation started. The imaging beam of the probe was aligned with the ultrasound stimulating beam. Therefore, one could confirm that the ultrasound beam was targeted at the region of interest using an image of the targeted organ/lymph node (visualized on the Vivid E9).

The following parameters relate to an alternative handheld ultrasound system used for low power (e.g., trickle) neuromodulation experiments.
GE V-scan Hand-held Ultrasound System (General Electric Healthcare). Setting #117-abdominal/deep probe preset; unit set to color mode (MI: 1.0 and Tis: 1.2)
The depth of focus for this setting was estimated to be 4.1 cm.
Compared to the prototype stimulation described above, these settings provide a lower power stimulus:
Carrier Frequency—1.8 MHZ
PRF=68 Hz
Duty Cycle=0.0048%
Isppa (peak acoustic intensity)=200 W/cm$^2$
Ispta (average acoustic intensity)=10 mW/cm$^2$
Stimulation time-20 minutes duration (per anatomical site)

The following relates to the diabetic animal model used and the method of ultrasound neuromodulation.
Animal Model of Type 2 Diabetes
Zucker diabetic fatty (ZDF) rat model
Adult male ZDF rats (Charles River, Kingston, NY USA) were ordered for arrival prior to 8 weeks of age. All animals were maintained on a high caloric rodent chow (Purina 5008), provided, with water, provided ad libitum. All rats were housed at 25° C. on a 12-h light/dark cycle and acclimatized for a minimum of 1 week, with handling, before experiments were conducted to minimize potential confounding glucose measures due to stress response. All procedures performed in accordance with the National Institutes of Health (NIH) Guidelines under protocols approved by the Institutional Animal Care and Use Committee (IACUC) of GE Global Research. ZDF animals were acclimated by daily handling to prevent stress-induced changes in circulating glucose. After 8 weeks, ZDF rodents began to exhibit rapid development of the diabetic phenotype and were then separated into either Sham-CTRL (control) or pFUS (peripheral focused ultrasound) treatment groups for acute or chronic ultrasound stimulation.

All rats were anesthetized at 1-4% isoflurane at 1 L/min $O_2$. Rats were then placed on a water circulating warming pad, with a rectal thermometer probe to maintain body temperature. The abdominal area was completely shaved and the hair fully removed with Nair to allow for later stimulation of nerve plexus located in either the hepatic or GI systems. The porta hepatis, fundus, superior and inferior mesenteric nerve regions were localized using a custom ultrasound imaging device (Vivid E9; GE Healthcare). These locations were then marked with a permanent marker and a ultrasound stimulation probe was placed on the target area.

Single-Site Stimulation Conditions:
After locating the target(s) of either the hepatic/portal, fundus, superior or inferior mesenteric nerve plexus regions either a pFUS prototype device or a hand-held ultrasound device was used to deliver a designated ultrasound treatment of either
The prototype pFUS device then delivered 3 minutes of stimulation (1.1 MHz, 150 burst cycles, 500 us burst period)
The handheld ultrasound device a lower power setting was used to deliver 20 minutes of stimulation (1.8 MHz, 68 Hz pulse repetition frequency, duty cycle 0.0048%)

Blood glucose levels of the rats were monitored on a daily basis for chronic studies and at 5-minute intervals for acute and OGTT studies. In chronic studies additional blood samples were collected on a weekly basis for the analysis of circulating markers. A final terminal blood sample was collected at the time of euthanization and used for the evaluation of circulating insulin levels.

Dual-Site Stimulation Conditions: Following single-site stimulation studies, a combination of the lead target regions (e.g. portal region, superior mesenteric nerve plexus) identified in the single-site stimulation studies, were tested in combination during a single session.

For the prototype pFUS device, stimulus (1.1 MHZ, 200 mV per pulse, 150 burst cycles, 500 us burst period) was applied to each region for 3 minutes per target. For example, pFUS was initially applied to the hepatic portal region for 3 minutes. Immediately following pFUS stimulus to the hepatic portal region the probe was moved to the superior mesenteric nerve region and a second pFUS application was applied. Application of pFUS to the hepatic and superior mesenteric regions was varied daily, alternating the initial site of stimulus (e.g. Day 1: hepatic pFUS→superior mesenteric pFUS, Day 2: superior mesenteric pFUS→hepatic pFUS, etc.). There was an about 5 minute delay period in between stimulation of the first and second, or second and third anatomical target sites.

For the handheld ultrasound device, lower power stimulus described above using the hand-held was applied to each region for a 20 minutes per target. As with the prototype pFUS device, the handheld ultrasound device was applied initially to one target followed by the second target, with target alternation occurring daily (e.g. Day 1: hepatic pFUS-→superior mesenteric pFUS, Day 2: superior mesenteric pFUS→hepatic pFUS, etc.). However, in the case of the handheld device, a period of 20 minutes of rest was allowed between target stimulus to limit somewhat heating of the handheld device which may confound results.

Blood samples obtained from the tail vein were used to assess daily glucose (for chronic studies) and 5-minute glucose intervals (for acute studies) using a Freestyle Freedom Lite (Abbott Diabetes Inc., Alameda, CA, US). The Freestyle Freedom Light meter using a small blood volume (0.3 uL) and as such no additional fluids were needed to recover total volume following blood sampling.

Rats were fasted overnight (12-16 h) prior to anesthetization and placement of a tail vein catheter 20 and collection of baseline blood samples. Immediately following the collection of the baseline sample, a single round of pFUS stimulation was applied and the animal allowed to recover from anesthesia. Upon recover, the animal was given a single oral dose of 2 g/kg glucose solution by oral syringe feeding. Following glucose administration blood samples were collected on a 5-minute basis from the tail vein by catheter collection. All procedures were performed following Institutional Animal Care and Use Committee (IACUC) of GE Global Research. The area under the curve (AUC) determined by glucose levels at baseline and 120 minutes after glucose overload was considered for calculation of AUC-OGTT (oral glucose tolerance test).

The disclosed neuromodulation techniques include administration of a pharmaceutical treatment to a patient. The pharmaceutical treatment may be any compound, agent, drug, treatment or other therapeutic dose, regimen, or protocol having a desired therapeutic or clinical effect when combined with neuromodulation techniques. The pharmaceutical treatment may include one or more of an oral, parenteral, intravenous, topical, inhaled, or mucosally administered drug, by way of example.

Combination of pharmaceutical intervention and pFUS therapy was tested to determine the effects of dual therapies on therapeutic window as well as duration of efficacy. Available human dose-response relationships for metformin and liraglutide were used to select the lowest efficacious dose (Sefficacious dose affecting (ED20). This dose (ED20) represents a dose that produces a quantal effect (all or nothing) in 20% of the population that takes it representing a typical low dose option.

Metformin (33-100 mg) was formulated in sterile water to avoid taste aversion and given by oral syringe feeding twice daily, at 12-hour intervals, to account for plasma half-life of 6.2 hours. This dosing regimen (timing) is identical to that used in humans with dosing to occur prior to both morning and evening mealtimes.

Liraglutide (20 µg-50 µg) was formulated for parenteral injection in disodium phosphate dihydrate, 1.42 mg; propylene glycol, 14 mg; phenol, 5.5 mg; and water and injected once a day, by subcutaneous injection. This dosing regimen accounts for the prolonged plasma half-life of liraglutide of approximately 15 hours and administered in the morning in all cases.

Figure 5A:
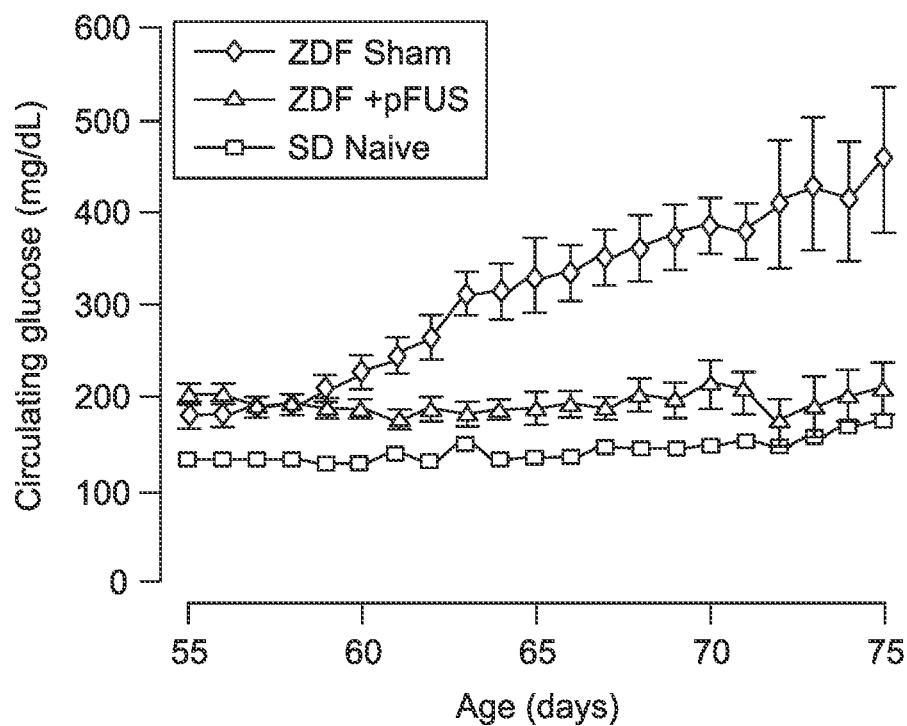
FIG. 5A shows glucose control in an animal model during daily hepatoportal plexus (single site) stimulation.
Figure 5B:
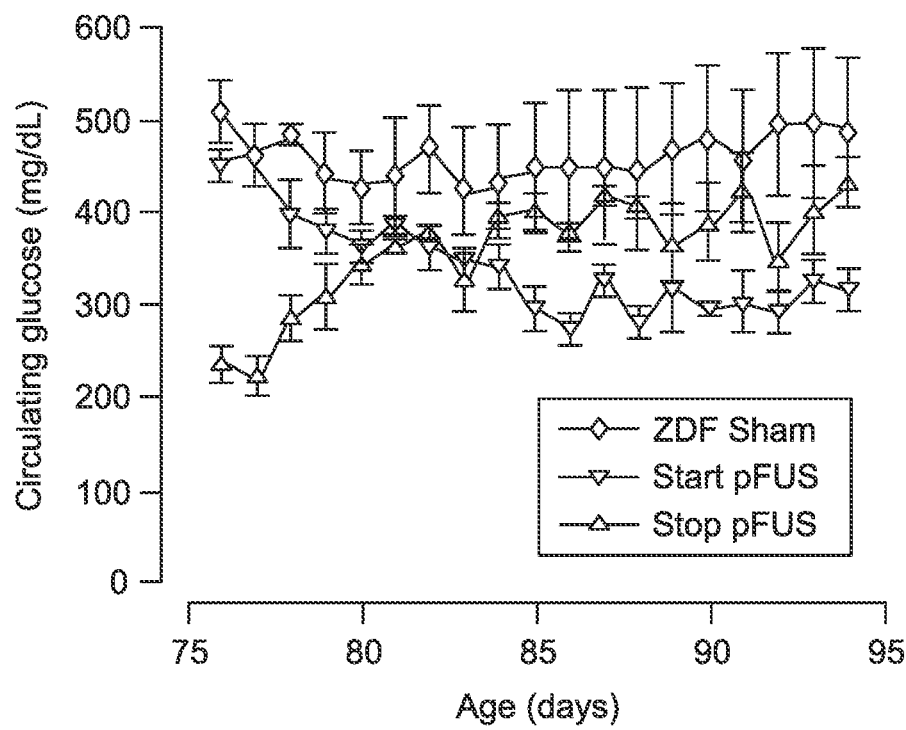
FIG. 5B shows cessation of duration of effect of FIG. 5A at three days upon ultrasound cessation after single site treatment.

FIG. 5A shows glucose control in an animal model during daily hepatoportal plexus (single site) stimulation. FIG. 5B shows cessation of duration of effect of FIG. 5A at three days upon ultrasound cessation. Daily stimulation is adequate to prevent or reverse hyperglycemia in the ZDF model as shown in FIG. 5A. However, upon cessation of the ultrasound treatment, as shown in FIG. 5B, hyperglycemia returns in only three days. Also shown in data associated with stimulation of a naïve/non-diabetic cohort and the results of a sham control (i.e. ultrasound probe placement, but no stimulus/ultrasound energy delivery), and represents the expected progressive increase in blood glucose (i.e. diabetes progression) in the ZDF model with no treatment. Thus, the ultrasound-mediated control of circulating glucose demonstrated in FIG. 5A reverts back to an uncontrolled state after cessation of the ultrasound stimulation doses, as shown in FIG. 5B, while another group with focused ultrasound demonstrates a reduction in circulating glucose.

Figure 6:
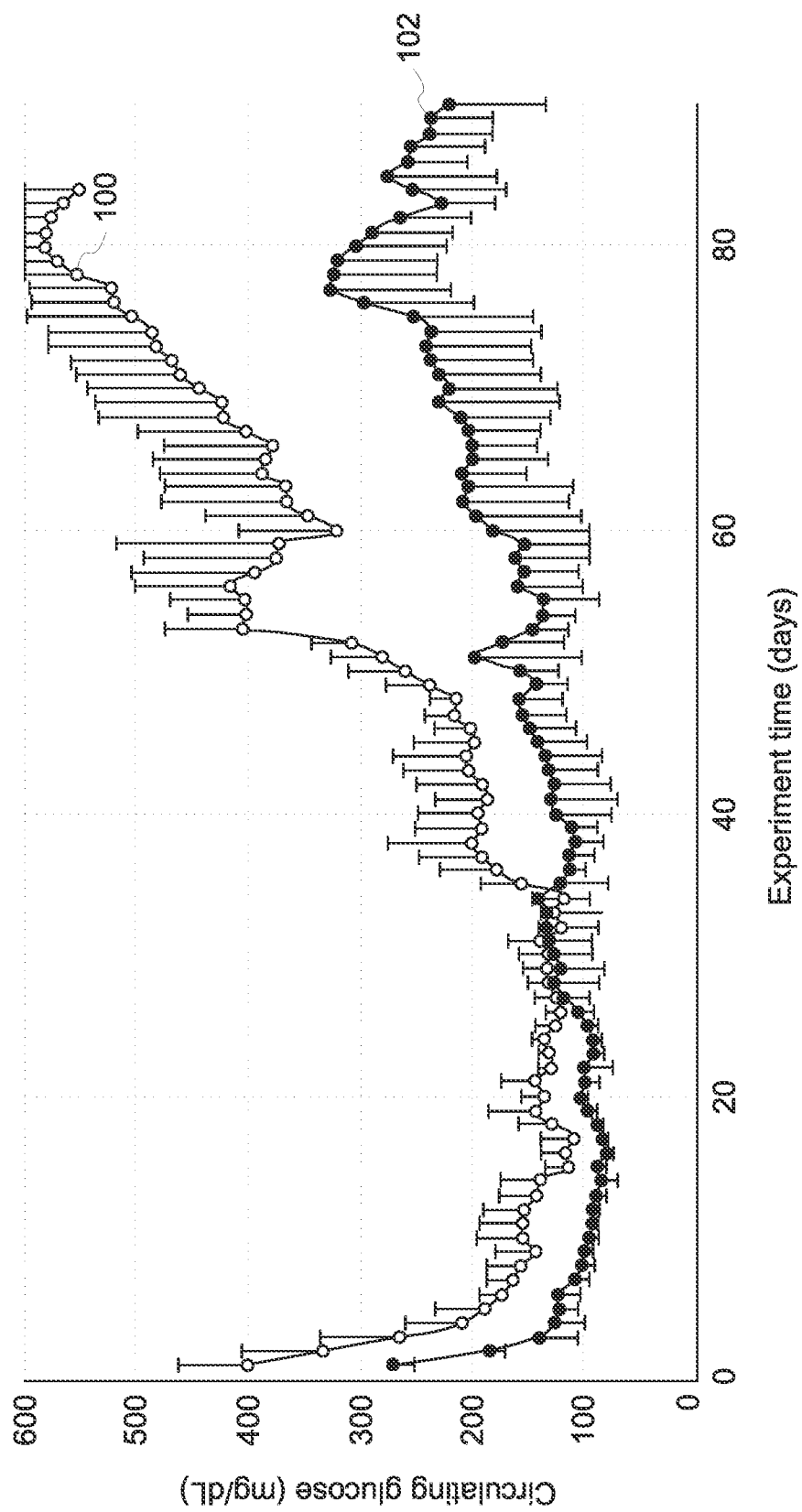
FIG. 6 shows longer term remission in the animal model after dual-site stimulation (i.e. hepatoportal plexus and superior mesenteric plexus) and even more prolonged remission when using dual-site stimulation with low dose GLP agonist liraglutide.

FIG. 6 shows longer term remission in the animal model after dual-site stimulation (i.e. hepatoportal plexus and superior mesenteric plexus, results shown in data 100) and even more prolonged remission when using the dual-site stimulation additionally with low dose GLP agonist liraglutide, results shown in data 102. The results demonstrate that dual-site stimulation (i.e. stimulation of both the hepatoportal plexus and superior mesenteric plexus) results in further lowering of blood glucose (after daily stimulation for 7 days). In addition, after 7 days of treatment, the ultrasound stimulation was stopped (on day 8) for the remainder of the experiment, and yet average blood glucose remained at or below 200 mg/dL for 36 days after ultrasound cessation (without any additional treatment). This represents one of the longest remission periods reported in the ZDF model.

In addition, when the dual-site stimulus was performed in addition to low dose treatment with the GLP agonist liraglutide (i.e. a drug targeting the effector tissue associated with the superior mesenteric plexus stimulus location; 102), the period of time in which the ZDF animals remained below 200 mg/dL was extended even further (again, after ultrasound cessation on day 8; with blood glucose remaining under 200 mg/dL for 56 day post-ultrasound).

Figure 7:
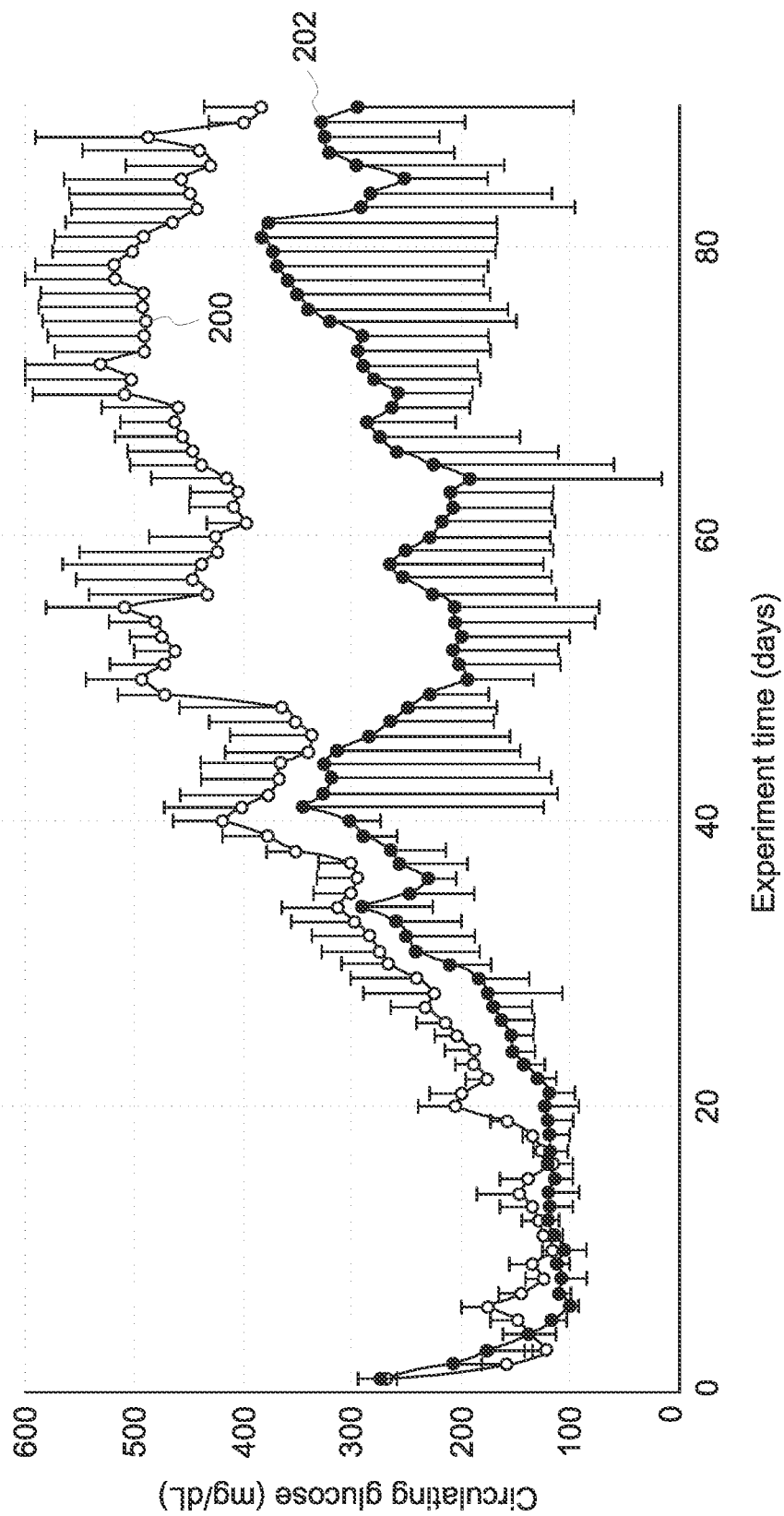
FIG. 7 compares remission periods in the animal model of drug alone vs. a combined neuromodulation of a single site stimulation combined with a drug treatment.

FIG. 7 compares remission periods in the animal model of drug alone versus a combined neuromodulation of a single site stimulation combined with a drug treatment. In contrast to the dual-treatment results shown in FIG. 6, FIG. 7 shows that single treatment with drug alone (i.e. low dose liraglutide; data shown in 200) or drug treatment plus a single hepatoportal plexus stimulation treatment (i.e. ultrasound at the portal site only for 7 days, and then just drug after day 8, data shown in 202) does not result in the same long-term remission. Even with continued liraglutide treatment (data 200), blood glucose rose above 200 mg/dL within 13 days (post-ultrasound period). The single site stimulation (i.e. 7 days of hepatoportal plexus stimulus alone) improved the length of time remaining under 200 mg/dL to 21 days, but did not result in long-term remission (i.e. which may be a remission greater than four weeks in the ZDF model). It should be understood that, in one embodiment, the disclosed treatment effects may be achieved via administration of two or more drugs.

Figure 8A:
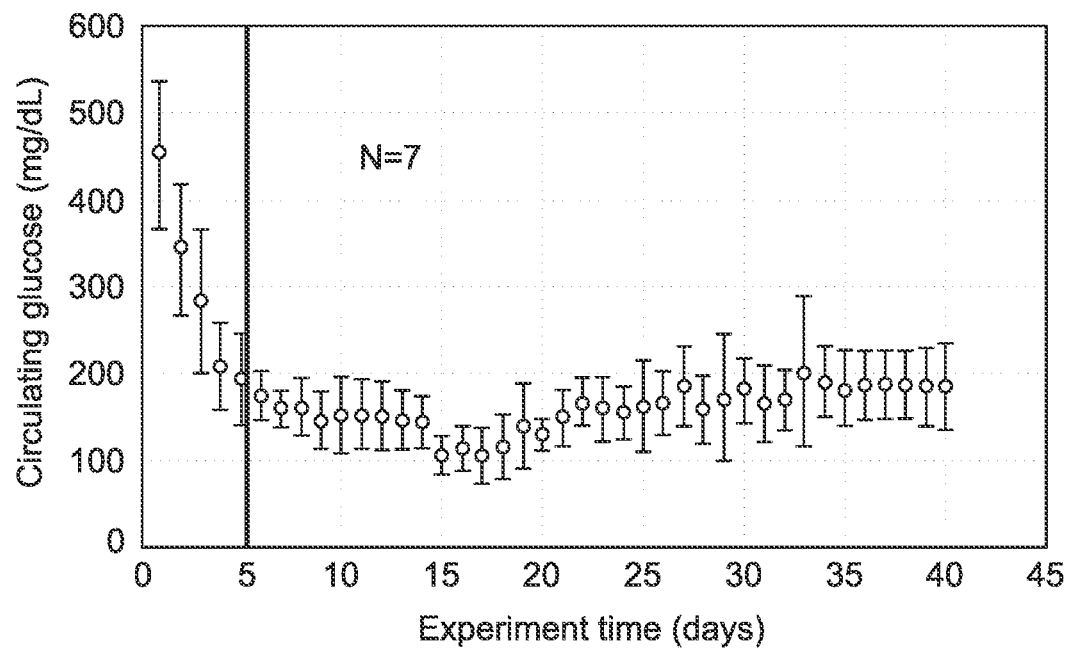
FIG. 8A shows effects on circulating glucose as a result of a combined neuromodulation of dual-site stimulation in late-stage ZDF (Zucker diabetic fatty rats) animals.
Figure 8B:
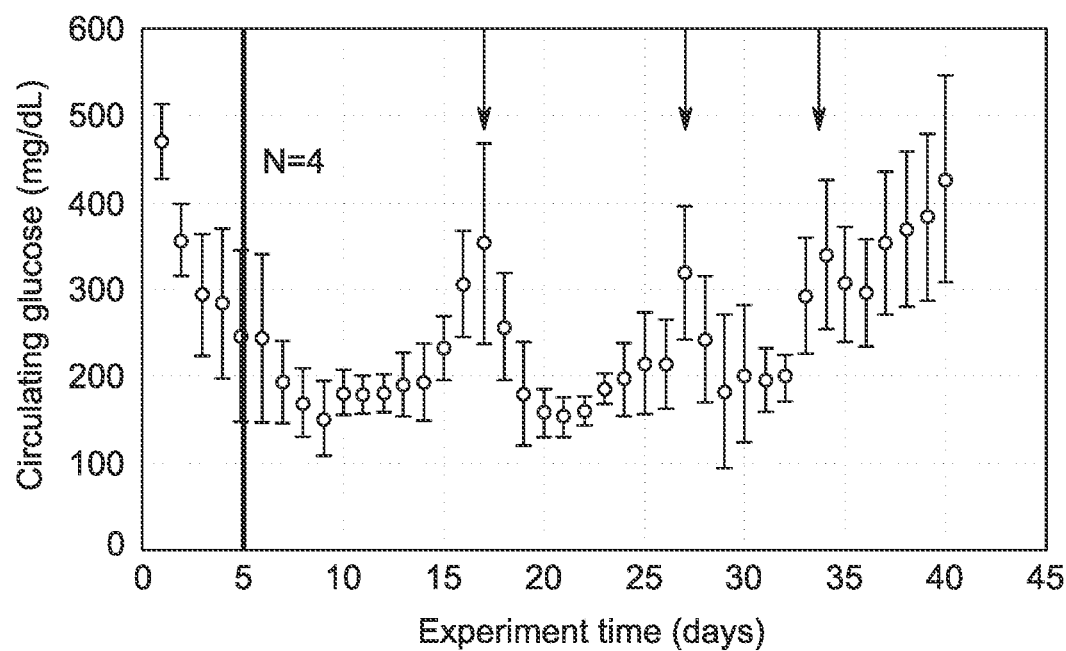
FIG. 8B shows effects on circulating glucose as a result of a combined neuromodulation of dual-site stimulation in late-stage ZDF animals.

FIGS. 8A-8B shows effects on circulating glucose as a result of a combined neuromodulation of dual-site stimulation in late-stage ZDF animals. In another experiment, the dual-site ultrasound stimulation treatment (i.e. hepatoportal plexus and superior mesenteric plexus stimulation) was performed in later stage ZDF cohorts (in which average blood glucose had already reach >400 mg/dL). The few treatments that have previously shown long-term remission the ZDF model (i.e. 4-week remission after FGF1 injection into the intracerebroventricular (icv) space or the ventricle underlying the arcuate nucleus) have failed to work in ZDF animals that were already far along in disease progression (i.e. >300 mg/dL average glucose). However, out of the 11 animal treated with the ultrasound stimulus 7 of them, shown in FIG. 8A, responded with remission (sub 200 mg/dL glucose levels) of 30 days following 5 day of daily ultrasound stimulation (and then cessation of the ultrasound treatment at day 6). Interestingly, 4 of the animals in this late stage cohort, shown in FIG. 8B, showed increasing blood glucose levels ~8 days after ultrasound treatment cessation, and underwent additional one day "bolus" dual-site stimuli at days 17, 27, and 34, but continued to progress toward hyper glycemia (even though each stimulus resulted in a transient decrease in blood glucose). This data indicates that long-term remission using combined neuromodulation treatments may be related to an intact insulin signal.

Figure 9:
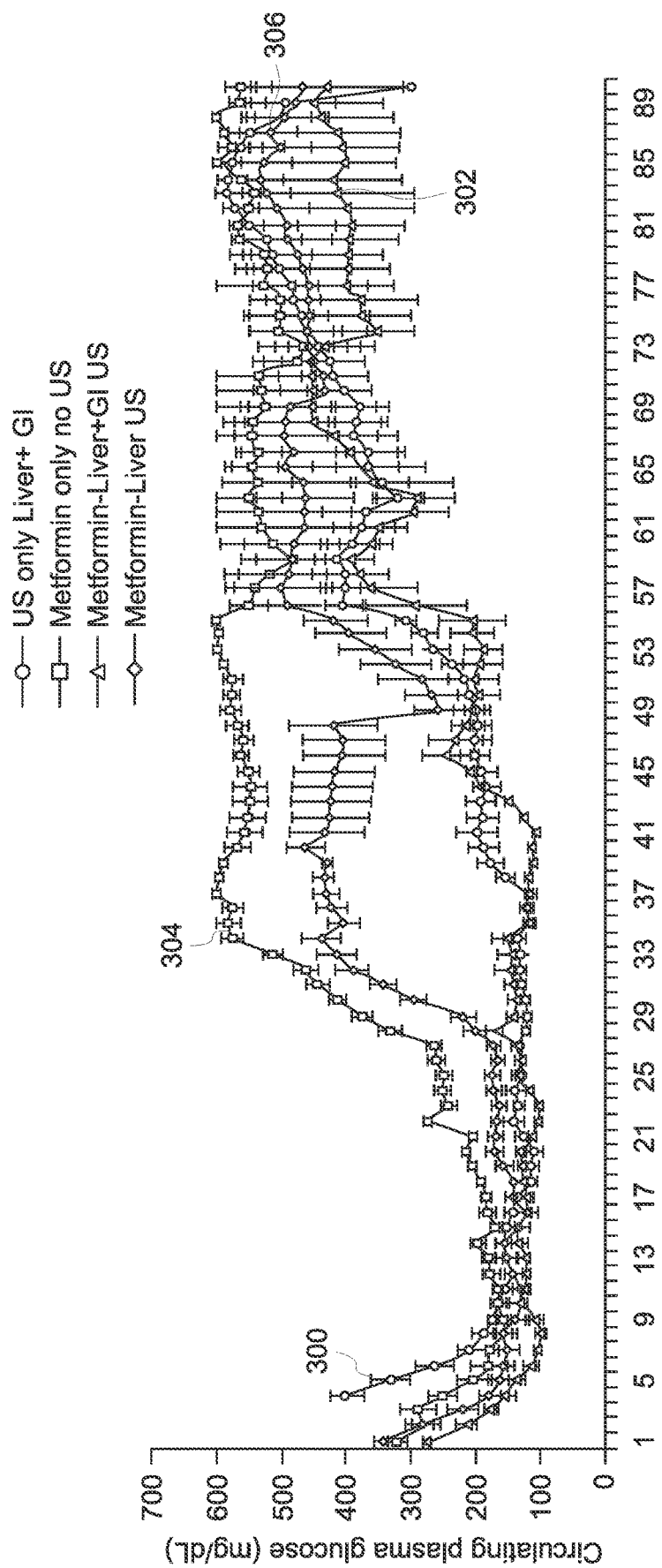
FIG. 9 shows dual-site vs. single site stimulation during treatment with metformin in the animal model.

FIG. 9 shows dual-site vs. single site stimulation during treatment with metformin in the animal model. In additional experimental cohorts, single and dual-site stimulation treatments (again, with ultrasound stimulation for 7 days and then stopping for the remainder of the experiment) were performed with and without administration of a low dose of the anti-diabetic drug Metformin (i.e. an alternative, non-GLP pathway diabetes medication). The data for the dual-site stimulation, data 300, again shows the achievement of long-term remission (i.e. >4 weeks) after ultrasound cessation in the dual-ultrasound stimulation (no drug) cohort. The dual-site stimulation was a liver (hepatoportal plexus) and gastrointestinal (superior mesenteric plexus stimulation) stimulation. However, the addition of a low dose of metformin to that cohort did not result in extended remission (as it did in FIG. 6 with the GLP agonist; data 302). The metformin alone cohort, shown in data 304, did show a temporary drop below 200 mg/dL, but was not as effective as the liraglutide alone cohort (in terms of absolute decrease in blood glucose or the length of time spent below 200 mg/dL); likewise, the metformin plus single site (hepatoportal plexus) stimulus group, data 306, was not as effective in terms of blood glucose reduction duration as the single site plus liraglutide cohort as shown in FIG. 6.

Figure 10A:
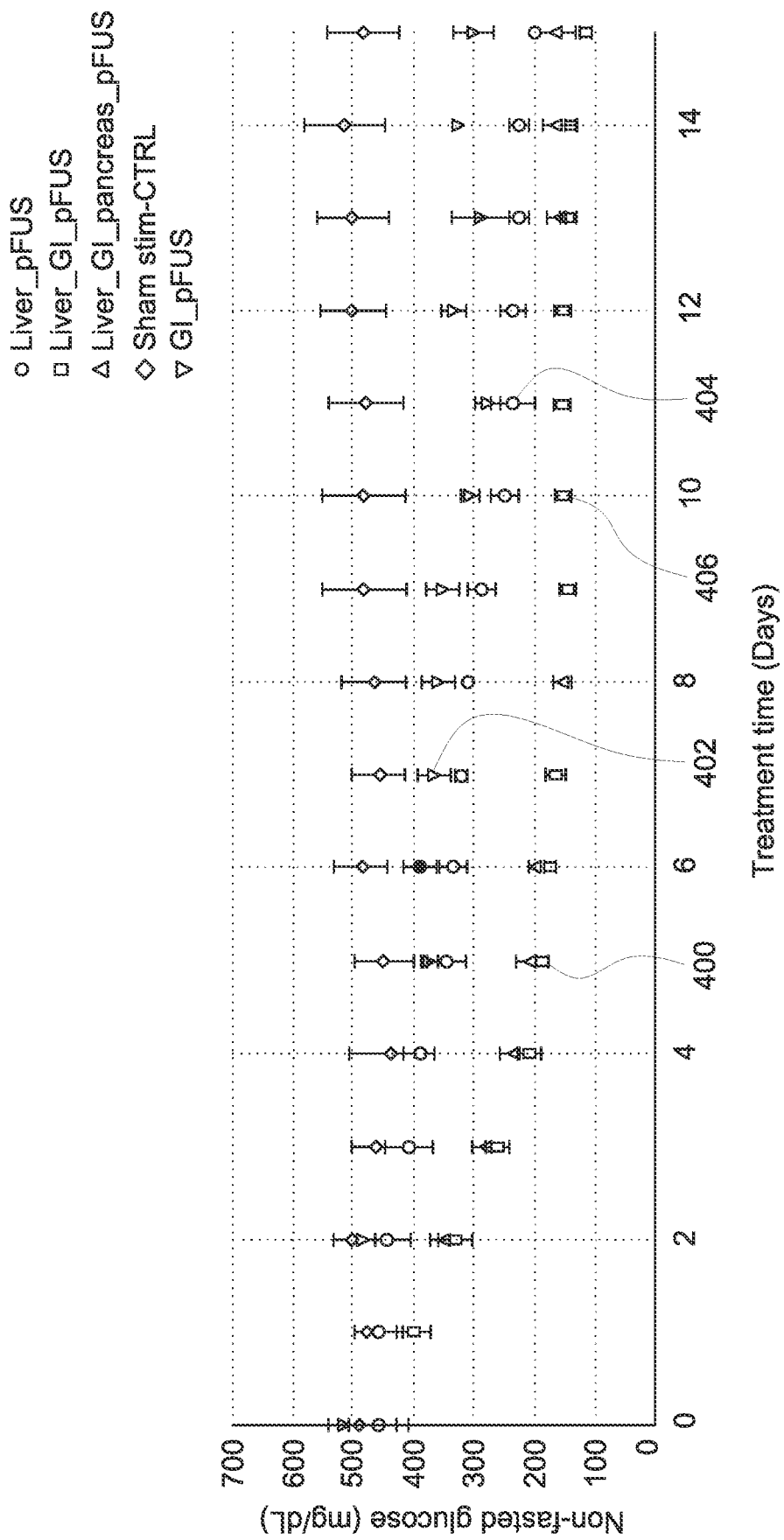
FIG. 10A shows non-fasted blood glucose concentrations in the animal model for combined neuromodulation therapies, single-site stimulations, and controls.

FIGS. 10A-E show data from dual-site, multi-site, or single-site ultrasound stimulations. In FIG. 10A, blood glucose was monitored for 14 days of continued stimulation with the dual-site treatment describe above (i.e. hepatoportal plexus stimulation and superior mesenteric plexus stimulation; shown as data 400), multiple single site (i.e. hepatoportal plexus/liver (shown as data 402) alone, or superior mesenteric plexus/GI (shown as data 404) alone), or a triple stimulus (i.e. hepatoportal plexus/liver, superior mesenteric plexus/GI, plus direct stimulation of the pancreas). In previous, reports we have shown that direct stimulation of the pancreas results in increased secretion of insulin (with no effect on glucagon).

Figure 10B:
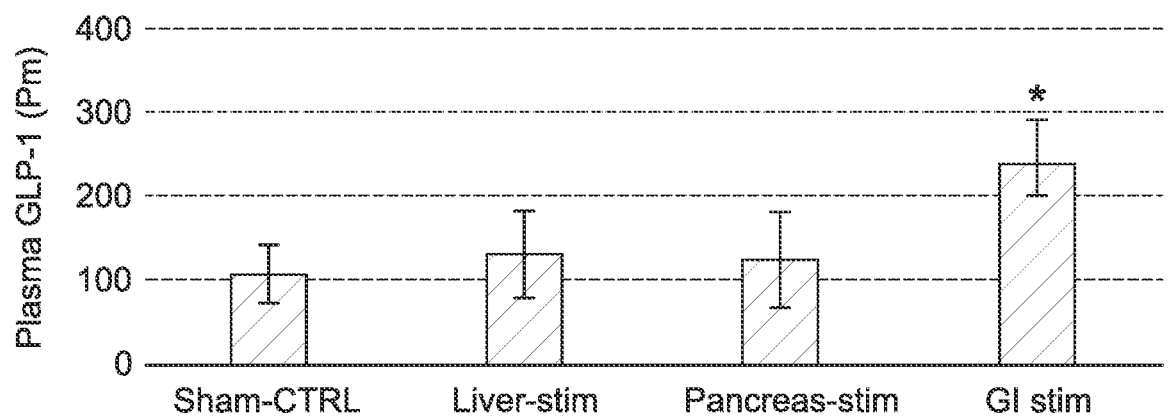
FIG. 10B shows plasma GLP-1 concentrations in the animal model for different single-site stimulation sites/targets alone.
Figure 10C:
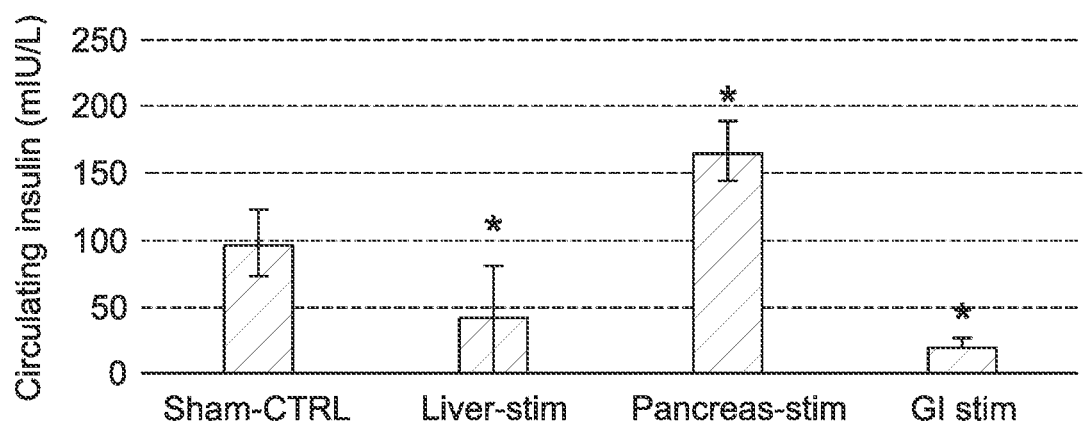
FIG. 10C shows circulating insulin concentrations in the animal model for different single-site stimulation sites/targets alone.
Figure 10D:
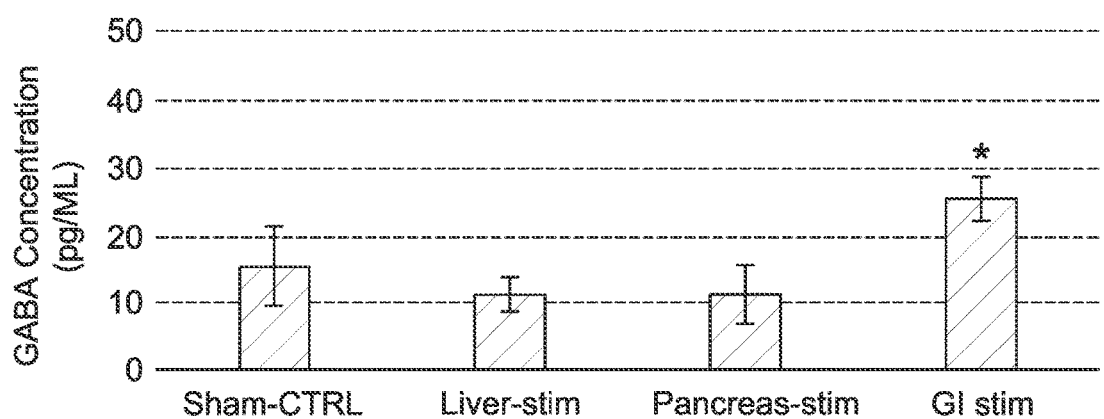
FIG. 10D shows GABA concentrations in the animal model for different single-site stimulation sites/targets alone.
Figure 10E:
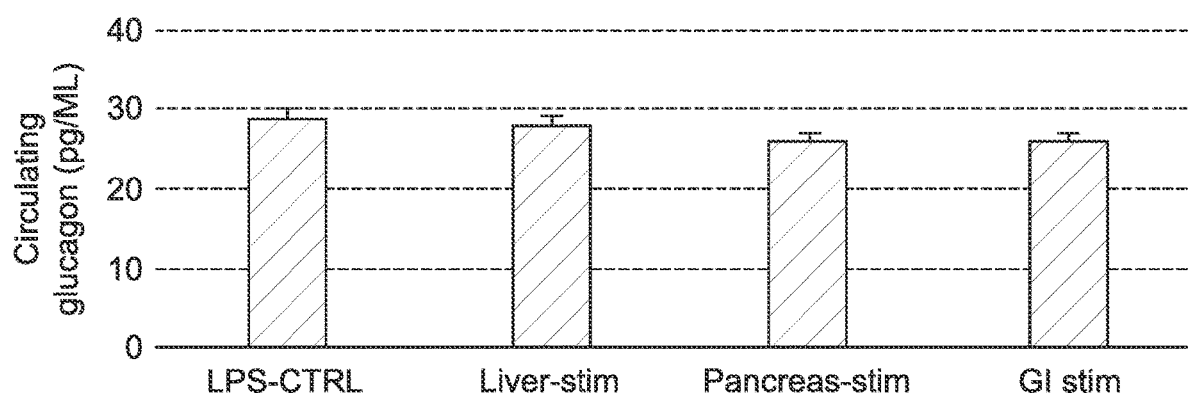
FIG. 10E shows circulating glucagon concentrations in the animal model for different single-site stimulation sites/targets alone.

Stimulation of the liver and GI site resulted in a rapid decrease in blood glucose in ZDF model cohorts to values below 200 mg/dL (shown as data 404); the addition of the third site (pancreas; shown as data 406) did not result in any additional benefit or reduction in blood glucose values. Both of the single site stimulation treatments (i.e. liver or GI stimulation; 402, 404) resulted in a slower reduction in blood glucose that did not achieve the same reduction in glucose at day 14 (compared to the dual-stimulation treatment). ZDF receiving sham control/probe placement with no ultrasound did not demonstrate any reduction in glucose levels. FIG. 10B shows plasma GLP-1 concentrations in the animal model for single-site stimulation alone. FIG. 10C shows circulating insulin concentrations in the animal model for single-site stimulation alone. FIG. 10D shows GABA concentrations in the animal model for single-site stimulation alone. FIG. 10E shows circulating glucagon concentrations in the animal model for single-site stimulation alone. As shown in FIGS. 10B-E, pancreas stimulation resulted in increased insulin levels in blood (FIG. 10C, while GI stimulation resulted in increased GLP levels (FIG. 10B) and GABA levels (FIG. 10D).

Figure 11:
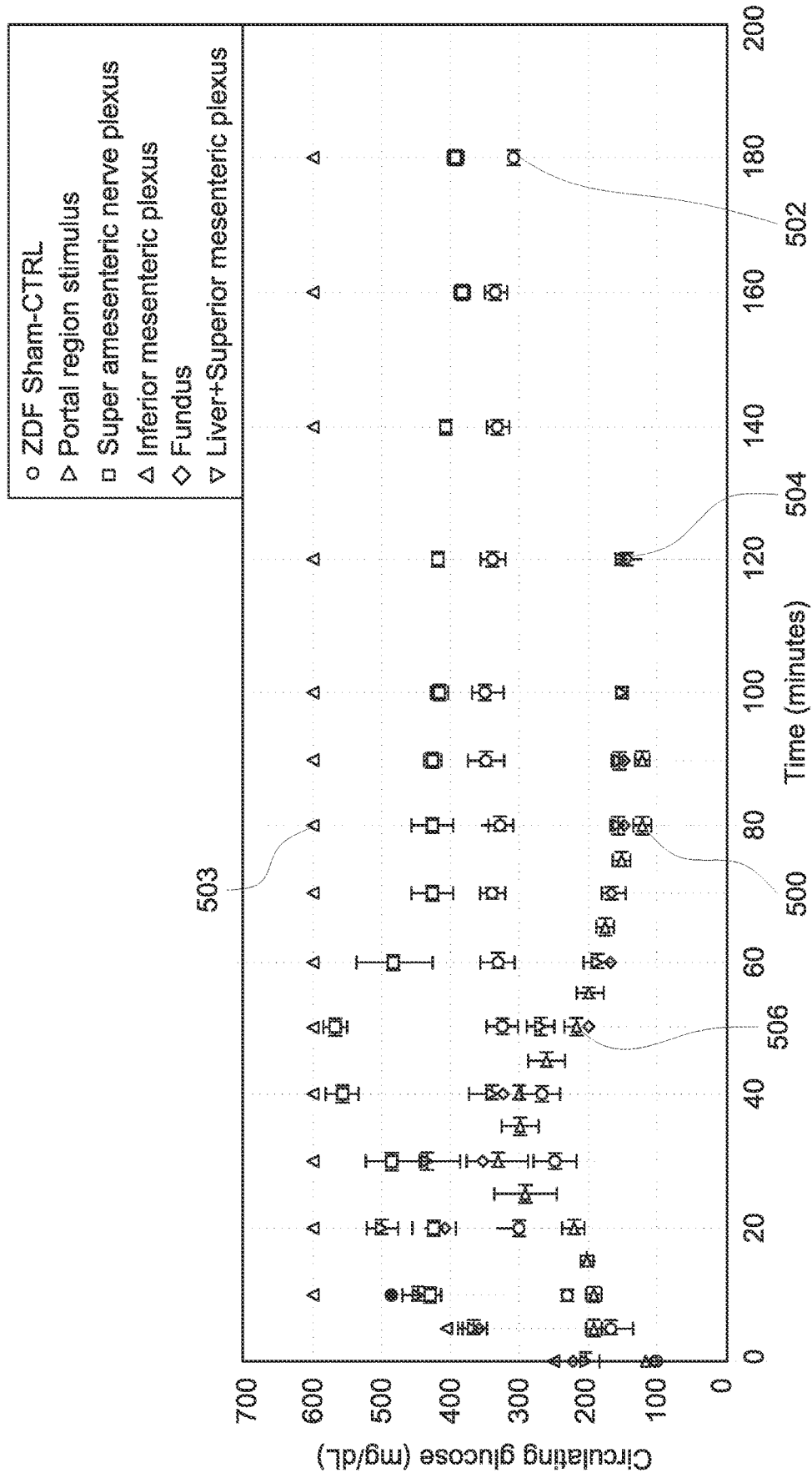
FIG. 11 shows circulating glucose concentrations in acute oral glucose tolerance tests in the animal model for combined neuromodulation therapies, single-site stimulations, and controls.

FIG. 11 shows circulating glucose concentrations in acute oral glucose tolerance tests in the animal model for combined neuromodulation therapies, single-site stimulations, and controls. In the ZDF model, liver stimulation alone (shown in data 500; portal region stimulus) resulted in improved glucose regulation compared to sham controls (shown in data 502). That is, glucose values were reduced post-40 minutes during the oral glucose tolerance test. Surprisingly, none of the gastrointestinal tract (GI) sites showed improvements during these short-term/acute OGTT tests, and each different GI site showed different effects on the OGTT glucose curve. That is, single site stimulation of the superior mesenteric nerve plexus, the inferior mesenteric nerve plexus (shown in data 503), or the fundus of the stomach resulted in elevated glucose levels in the first 40 minutes of the OGTT compared to sham controls. In addition, the two mesenteric sites had higher glucose levels throughout the test (out to 200 minutes). Interestingly, dual stimulation of the superior mesenteric plexus and portal site resulted in OGTT curve kinetics that showed curve similar to the single GI site during the first 40 minutes, but kinetics similar to the single liver site during the period between 40-200 minutes. And, while the long-term benefit of the dual-site stimulation in the figure above is apparent and profound (i.e. long-term remission in the ZDF model), the further benefit of the GI stimulation is not readily apparent in the acute OGTT test. A further surprising result is the similar kinetics between the dual-site stimulation (shown in data 504) and stomach fundus stimulation (shown in data 506), suggesting that a single autonomic stimulation site can yield similar results to the "mixed" or dual-site stimulus treatment. It should be understood that, in embodiments, the disclosed remission results may be achieved with single-site stimulation. In one embodiment, single-site stimulation of the gastrointestinal tissue may induce remission for a metabolic disorder. In one embodiment, the single-site stimulation may be for a total time that is a combined time of a dual-site stimulation as disclosed herein.

Figure 12:
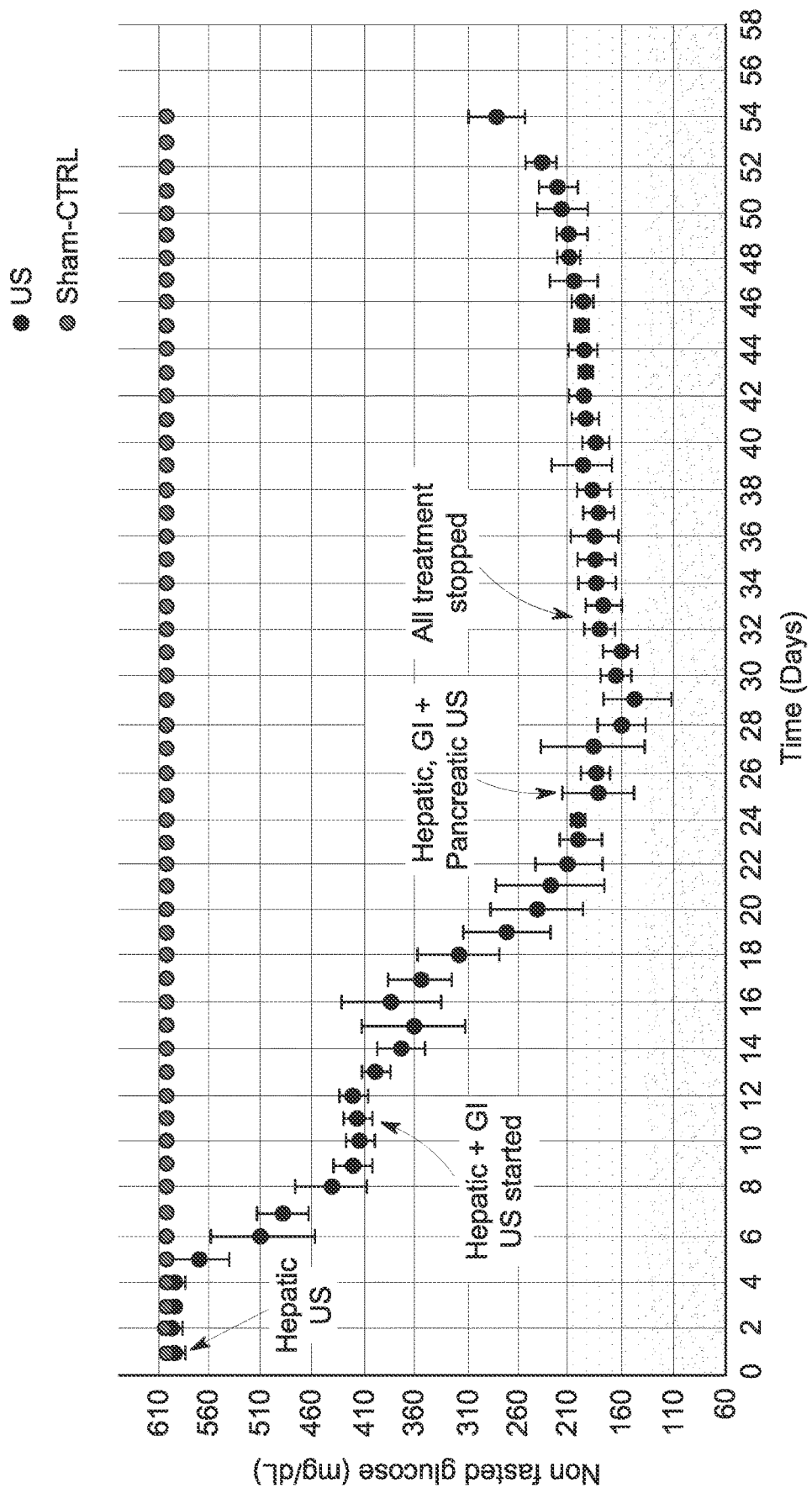
FIG. 12 shows non-fasted circulating glucose concentrations in the animal model for combined neuromodulation therapies and controls at various initiation and cessation time points.

FIG. 12 shows non-fasted circulating glucose concentrations in the animal model for combined neuromodulation therapies and controls at various initiation and cessation time points. Data in FIGS. 5-11 was generated using the prototype ultrasound system at relatively high-power levels (i.e. 6,263 mW/cm^2); though this was still much lower than levels associated with cavitation and/or tissue damage. FIG. 12 shows that ultrasound stimulation at much lower powers using a hand-held/battery operated ultrasound system (i.e. GE Vscan described above at ~10 mW/cm^2) is also capable of producing neuromodulation outcomes. However, in this cohort (with lower power stimulation) each anatomical location was treated/stimulated for 20 minutes (i.e. for dual site 40 minutes or 20 minutes at each site and for triple site 60 minutes of 20 minutes at each site). In all previous, high power stimulation tests the stimulus duration at each site was only 3 minutes. Also, in this cohort single site stimulation was started at day 0, the GI site was added for dual-stimulation treatment at day 11, and the pancreas was added at day 25. As shown above, the additional of multiple site stimulation led to further reduction in glucose compared to single site stimulation alone. All ultrasound treatment was stopped at day 32. For this cohort, starting blood concentration were very high (even higher than FIG. 8), and remission after ultrasound treatment cessation lasted approximately 15 days.

Figure 13A:
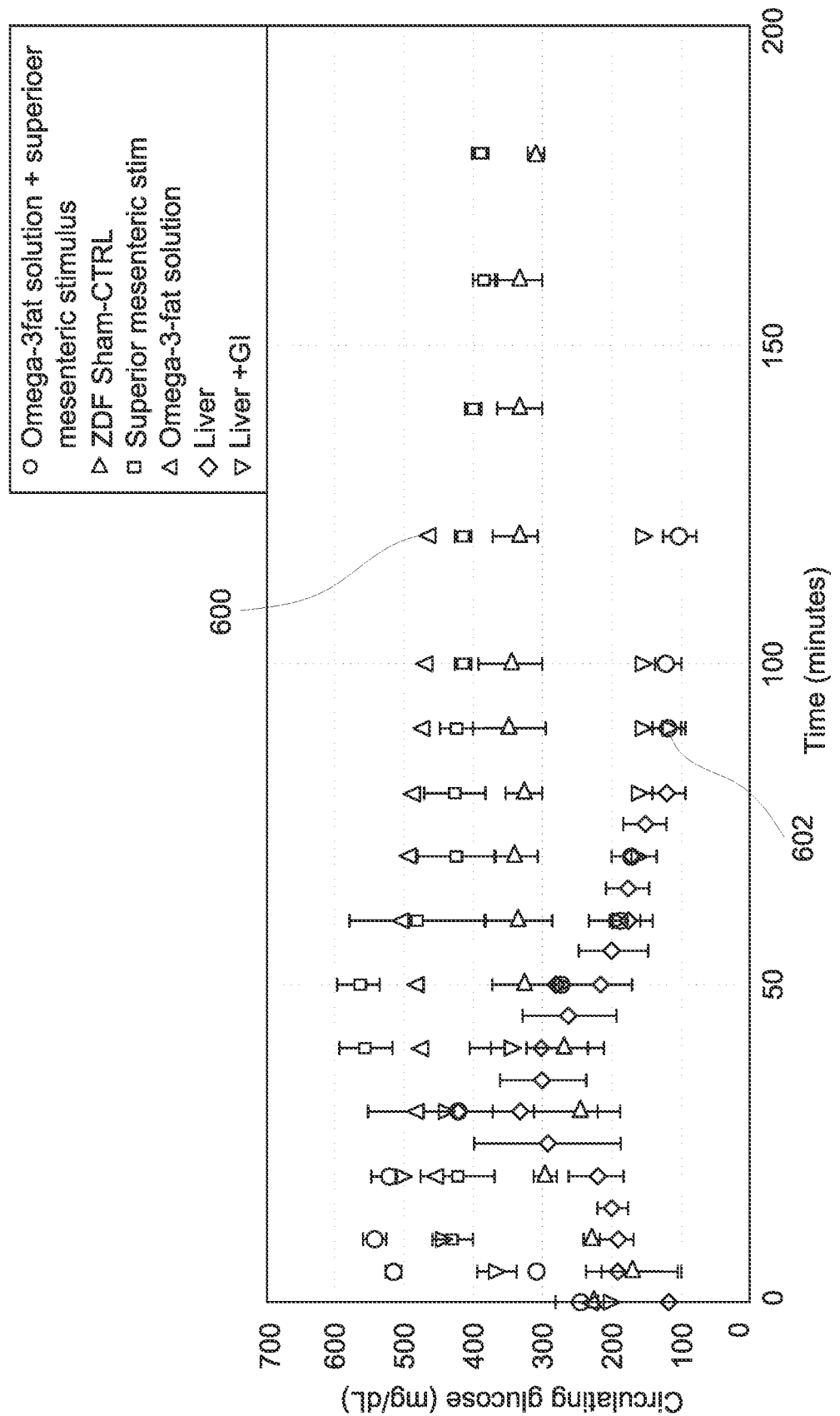
FIG. 13A shows circulating glucose concentrations in acute oral glucose tolerance tests in the animal model for single-site stimulations with nutrient adjuncts and controls.

FIG. 13A shows circulating glucose concentrations in acute oral glucose tolerance tests in the animal model for single-site stimulations with nutrient support and controls.

Figure 13B:
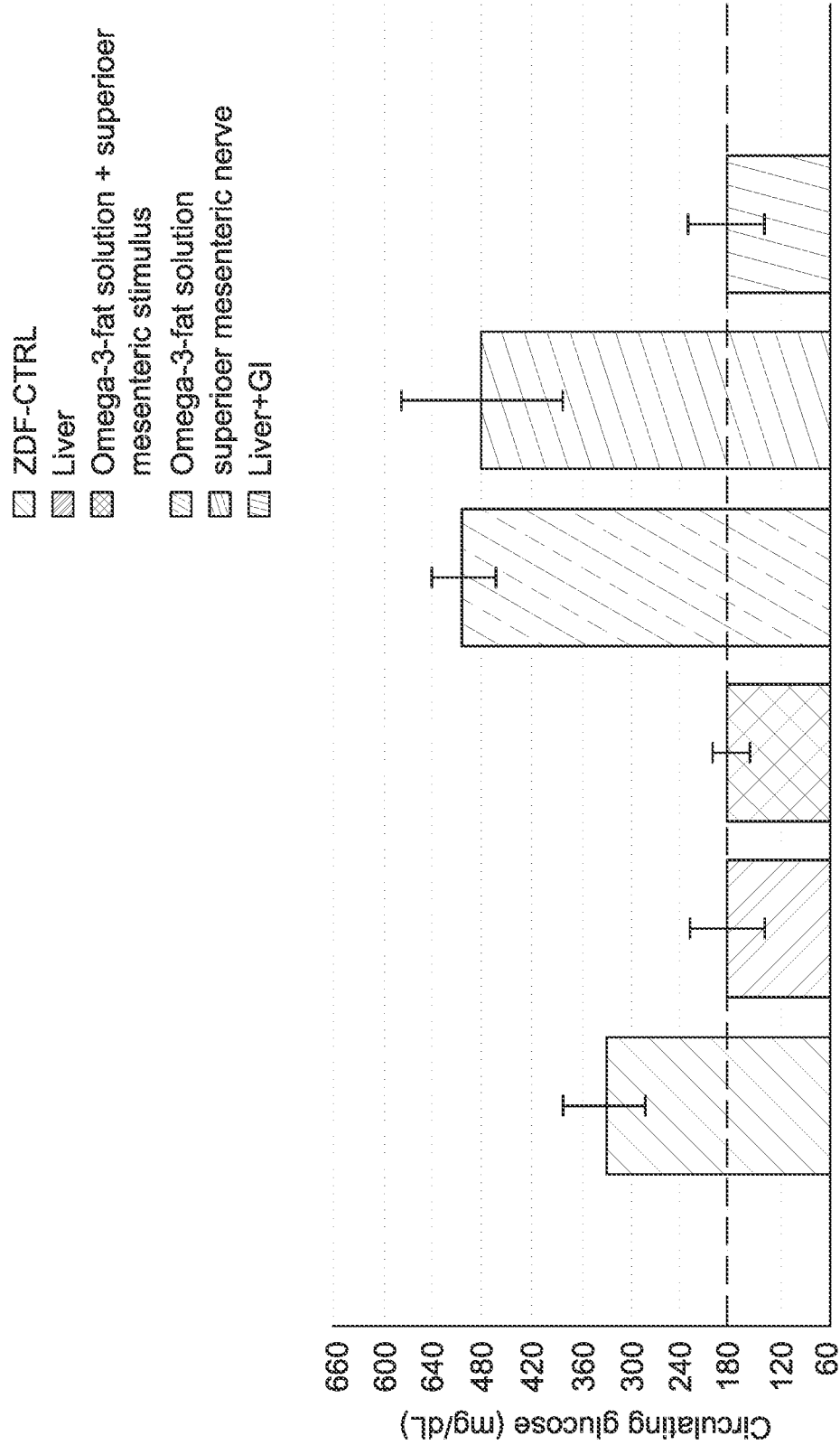
FIG. 13B shows circulating glucose concentrations in acute oral glucose tolerance tests in the animal model for single-site stimulations with nutrient adjuncts and controls.

FIG. 13B shows circulating glucose concentrations in acute oral glucose tolerance tests in the animal model for single-site stimulations with nutrient support and controls. As shown in FIG. 13A, liver stimulation alone (shown in data 600; portal region stimulus) resulted in improved glucose regulation compared to sham controls (shown in data 602). That is, glucose values were reduced post-40 minutes during the oral glucose tolerance test. While, none of the gastrointestinal tract (GI) sites showed improvements during these short-term/acute OGTT when given in alone, combination of GI stimulus with a single oral dose of omega-3-fat solution produced a OGTT curve kinetics similar to the single GI site during the first 40 minutes, but kinetics similar to the single liver site during the period between 40-200 minutes. Furthermore, the combination of omega-3-fat solution with single site GI stimulus produced an OGTT curve (FIG. 13B) identical to dual-site stimulus (liver and GI) suggesting that this single-autonomic stimulation site combined with nutrient support may yield similar results to the "mixed" or dual-site stimulus treatment.

Neuromodulation in Combined Neuromodulation Techniques

Neuromodulation of one or more regions of interest (e.g., single-site or multi-site) as provided herein permits a local and nonablative application of energy to only the targeted region or regions of interest (e.g., to a stimulation site or sites) and without the energy being applied outside of the region or regions of interest. Energy application may trigger downstream effects outside of the targeted region of interest, e.g., in the same organ, tissue or structure containing the region of interest or in other organs and structures that do not contain the targeted region of interest. In some embodiments, the downstream effects may be induced in areas of a hypothalamus by way of example. The energy application may also induce effects along the targeted nerve upstream from the site of the energy application. In some embodiments, the effects outside of the targeted region/s of interest may be achieved without direct energy application to areas outside of the region/s of interest where the downstream effects or upstream effects are induced. Accordingly, local energy application may be used to realize or achieve systemic effects which may include local effects, downstream effects and/or upstream effects. The targeted region or regions of interest may be any tissue or structure in the body having axon terminals forming synapses with non-neuronal cells or fluids. In one example, the region of interest may be a subregion of an organ or structure, such as a spleen, liver, pancreas, or gastrointestinal tissue. In another example, the regions of interest may be in a lymph system tissue.

Neuromodulation to the targeted regions of interest may exert a change in physiological processes to interrupt, decrease, or augment one or more physiological pathways in a subject to yield the desired physiological outcome. Further, because the local energy application may result in systemic changes, different physiological pathways may be changed in different ways and at different locations in the body to cause an overall characteristic profile of physiological change in the subject caused by and characteristic of the targeted neuromodulation for a particular subject. While these changes are complex, the present neuromodulation techniques provide one or more measurable targeted physiological outcomes that, for the treated subjects, are the result of the neuromodulation and that may not be achievable without the application of energy to the targeted region/s of interest or other intervention. Further, other types of intervention (e.g., drug treatment as part of the combined neuromodulation) may boost or enhance the physiological changes caused by neuromodulation.

The combined neuromodulation techniques discussed herein may be used to cause a physiological outcome of a change in concentration (e.g., increased, decreased) of a molecule of interest and/or a change in characteristics of a molecule of interest. That is, selective modulation of one or more molecules of interest (e.g., a first molecule of interest, a second molecule of interest, and so on) may refer to modulating or influencing a concentration (circulating, tissue) or characteristics (covalent modification) of a molecule as a result of energy application to one or more regions of interest (e.g., a first region of interest, a second region of interest, and so on) in one or more tissues (e.g., a first tissue, a second tissue, and so on). Modulation of a molecule of interest may include changes in characteristics of the molecule such as expression, secretion, translocation of proteins and direct activity changes based on ion channel effects either derived from the energy application itself or as a result of molecules directly effecting ion channels. Modulation of a molecule of interest may also refer to maintaining a desired concentration of the molecule, such that expected changes or fluctuations in concentration do not occur as a result of the neuromodulation. Modulation of a molecule of interest may refer to causing changes in molecule characteristics, such as enzyme-mediated covalent modification (changes in phosphorylation, aceylation, ribosylation, etc). That is, it should be understood that selective modulation of a molecule of interest may refer to molecule concentration and/or molecule characteristics. The molecule of interest may be a biological molecule, such as one or more of carbohydrates (monosaccharaides, polysaccharides), lipids, nucleic acids (DNA, RNA), or proteins. In certain embodiments, the molecule of interest may be a signaling molecule such as a hormone (an amine hormone, a peptide hormone, or a steroid hormone).

Certain embodiments described herein provide combined neuromodulation techniques that cause targeted physiological outcomes for the treatment of glucose metabolism and associated disorders. Glucose regulation is complex and involves different local and systemic metabolic pathways. Application of energy to targeted region/s of interest causes characteristic changes in these metabolic pathways to improve glucose regulation. In some embodiments, modulation at one or more regions of interest may be used to treat disorders including but not limited to, diabetes (i.e., type 1 or type 2 diabetes), hyperglycemia, sepsis, trauma, infection, physiologic stress, diabetes-associated dementia, obesity, or other eating or metabolic disorders. In some embodiments, neuromodulation may be used to promote weight loss, control appetite, treat cachexia, or increase appetite. In one example, physiologic stress may be medically defined to include a variety of acute medical conditions (infection, severe injury/trauma, heart attack, bypass) as well as surgical instances with presentation of hyperglycemia. For example, direct pancreatic stimulation may result in increased appetite, while direct liver stimulation may cause a decrease in NPY, which in turn promotes signals of satiety. The targeted physiological outcome may include tuning circulating (i.e., blood) glucose concentrations in a subject to be within a desired concentration range associated with normal glucose levels and avoiding hyperglycemia or hypoglycemia. In this manner, selective modulation of a molecule of interest may be achieved. The tuning may be a result of induced changes in glucoregulatory hormones in the blood or tissue via targeted neuromodulation to cause the desired glucose concentration (i.e. desired glucose end point). Further, glucose regulation may be beneficial for healthy patients without a disease diagnosis, but who are prediabetic or who are hoping to maintain a healthy weight.

Figure 14:
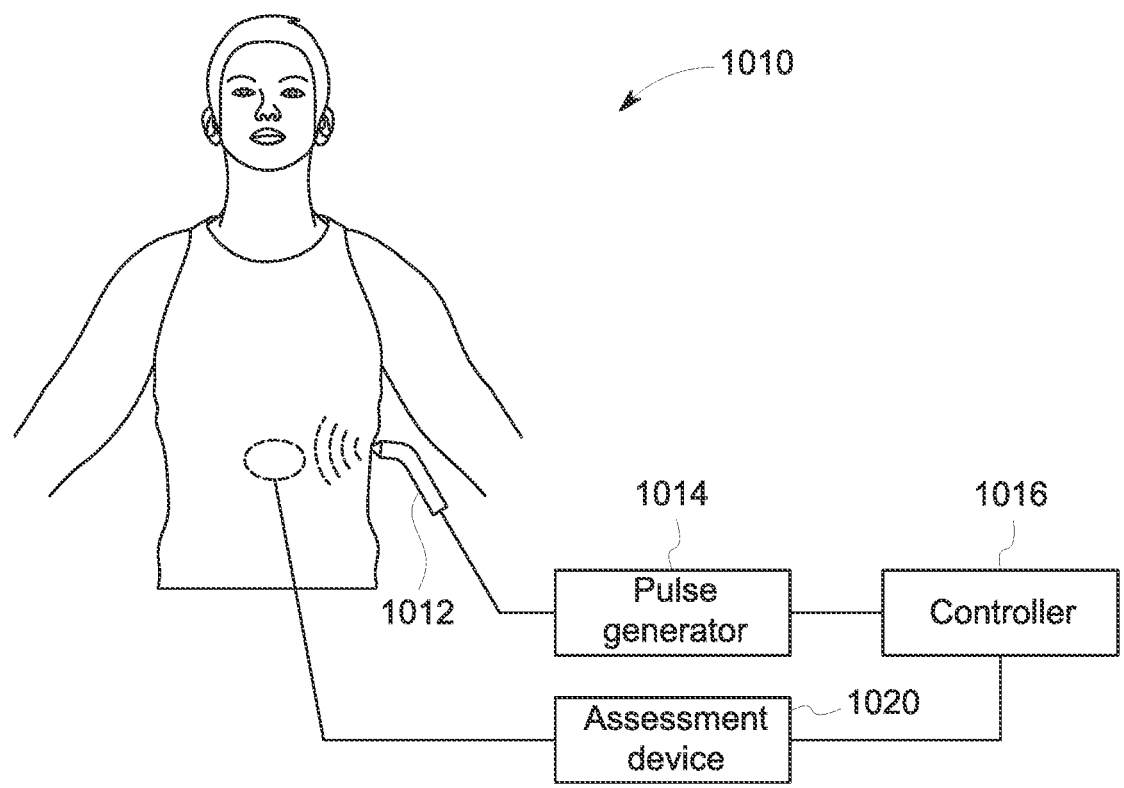
FIG. 14 is a schematic representation of a neuromodulation system using a pulse generator according to embodiments of the disclosure.

To that end, the disclosed neuromodulation techniques may be used in conjunction with a neuromodulation system. FIG. 14 is a schematic representation of a system 1000 for neuromodulation to achieve neurotransmitter release and/or activate components (e.g., the presynaptic cell, the postsynaptic cell) of a synapse in response to an application of energy. The depicted system includes a pulse generator 1014 coupled to an energy application device 1012 (e.g., an ultrasound transducer). The energy application device 1012 is configured to receive energy pulses, e.g., via leads or wireless connection, that in use are directed to a region of interest of an internal tissue or an organ of a subject, which in turn results in a targeted physiological outcome. In certain embodiments, the pulse generator 1014 and/or the energy application device 1012 may be implanted at a biocompatible site (e.g., the abdomen), and the lead or leads couple the energy application device 1012 and the pulse generator 1014 internally. For example, the energy application device 1012 may be a MEMS transducer, such as a capacitive micromachined ultrasound transducer.

In certain embodiments, the energy application device 1012 and/or the pulse generator 1014 may communicate wirelessly, for example with a controller 1016 that may in turn provide instructions to the pulse generator 1014. In other embodiments, the pulse generator 1014 may be an extracorporeal device, e.g., may operate to apply energy transdermally or in a noninvasive manner from a position outside of a subject's body, and may, in certain embodiments, be integrated within the controller 1016. In embodiments in which the pulse generator 1014 is extracorporeal, the energy application device 1012 may be operated by a caregiver and positioned at a spot on or above a subject's skin such that the energy pulses are delivered transdermally to a desired internal tissue. Once positioned to apply energy pulses to the desired site, the system 10 may initiate neuromodulation to achieve targeted physiological outcome or clinical effects.

In certain embodiments, the system 10 may include an assessment device 1020 that is coupled to the controller 1016 and assesses characteristics that are indicative of whether the targeted physiological outcome of the modulation have been achieved. In one embodiment, the targeted physiological outcome may be local. For example, the modulation may result in local tissue or function changes, such as tissue structure changes, local change of concentration of certain molecules, tissue displacement, increased fluid movement, etc.

The modulation may result in systemic or non-local changes, and the targeted physiological outcome may be related to a change in concentration of circulating molecules or a change in a characteristic of a tissue that does not include the region of interest to which energy was directly applied. In one example, the displacement may be a proxy measurement for a desired modulation, and displacement measurements below an expected displacement value may result in modification of modulation parameters until an expected displacement value is induced. Accordingly, the assessment device 1020 may be configured to assess concentration changes in some embodiments. In some embodiments, the assessment device 1020 may be an imaging device configured to assess changes in organ size and/or position. While the depicted elements of the system 10 are shown separately, it should be understood that some or all of the elements may be combined with one another. Further, some or all of the elements may communicate in a wired or wireless manner with one another.

Based on the assessment, the modulation parameters of the controller 1016 may be altered. For example, if a desired modulation is associated with a change in concentration (circulating concentration or tissue concentration of one or more molecules) within a defined time window (e.g., 5 minutes, 30 minutes after a procedure of energy application starts) or relative to a baseline at the start of a procedure, a change of the modulation parameters such as pulse frequency or other parameters may be desired, which in turn may be provided to the controller 1016, either by an operator or via an automatic feedback loop, for defining or adjusting the energy application parameters or modulation parameters of the pulse generator 1014.

The system 1000 as provided herein may provide energy pulses according to various modulation parameters. For example, the modulation parameters may include various stimulation time patterns, ranging from continuous to intermittent. With intermittent stimulation, energy is delivered for a period of time at a certain frequency during a signal-on time. The signal-on time is followed by a period of time with no energy delivery, referred to as signal-off time. The modulation parameters may also include frequency and duration of a stimulation application. The application frequency may be continuous or delivered at various time periods, for example, within a day or week. The treatment duration may last for various time periods, including, but not limited to, from a few minutes to several hours. In certain embodiments, treatment duration with a specified stimulation pattern may last for one hour, repeated at, e.g., 72 hour intervals. In certain embodiments, treatment may be delivered at a higher frequency, say every three hours, for shorter durations, for example, 30 minutes. The application of energy, in accordance with modulation parameters, such as the treatment duration and frequency, may be adjustably controlled to achieve a desired result.

Figure 15:
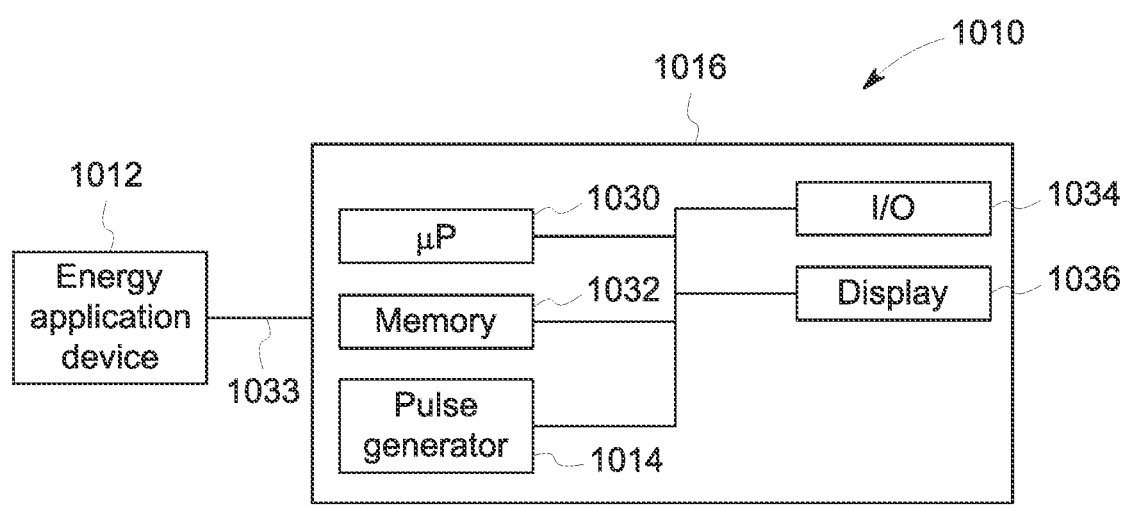
FIG. 15 is a block diagram of a neuromodulation system according to embodiments of the disclosure.

FIG. 15 is a block diagram of certain components of the system 1000. As provided herein, the system 1000 for neuromodulation may include a pulse generator 1014 that is adapted to generate a plurality of energy pulses for application to a tissue of a subject. The pulse generator 1014 may be separate or may be integrated into an external device, such as a controller 1016. The controller 1016 includes a processor 1030 for controlling the device. Software code or instructions are stored in memory 1032 of the controller 1016 for execution by the processor 1030 to control the various components of the device. The controller 1016 and/or the pulse generator 1014 may be connected to the energy application device 1012 via one or more leads 1033 or wirelessly The controller 1016 also includes a user interface with input/output circuitry 1034 and a display 1036 that are adapted to allow a clinician to provide selection inputs or modulation parameters to modulation programs. Each modulation program may include one or more sets of modulation parameters including pulse amplitude, pulse width, pulse frequency, etc. The pulse generator 1014 modifies its internal parameters in response to the control signals from controller device 1016 to vary the stimulation characteristics of energy pulses transmitted through lead 1033 to an subject to which the energy application device 1012 is applied. Any suitable type of pulse generating circuitry may be employed, including but not limited to, constant current, constant voltage, multiple-independent current or voltage sources, etc. The energy applied is a function of the current amplitude and pulse width duration. The controller 1016 permits adjustably controlling the energy by changing the modulation parameters and/or initiating energy application at certain times or cancelling/suppressing energy application at certain times. In one embodiment, the adjustable control of the energy application device is based on information about a concentration of one or more molecules in the subject (e.g., a circulating molecule). If the information is from the assessment device 1020, a feedback loop may drive the adjustable control. For example, if a circulating glucose concentration, as measured by the assessment device 1020, is above a predetermined threshold or range, the controller 1016 may initiate energy application to a region of interest (e.g., liver) and with modulation parameters that are associated with a reduction in circulating glucose. The initiation of energy application may be triggered by the glucose concentration drifting above a predetermined (e.g., desired) threshold or outside a predefined range. In another embodiment, the adjustable control may be in the form of altering modulation parameters when an initial application of energy does not result in an expected change in a targeted physiological outcome (e.g., concentration of a molecule of interest) within a predetermined time frame (e.g., 1 hour, 2 hours, 4 hours, 1 day).

In one embodiment, the memory 1032 stores different operating modes that are selectable by the operator. For example, the stored operating modes may include instructions for executing a set of modulation parameters associated with a particular treatment site, such as regions of interest in the liver, pancreas, gastrointestinal tract, spleen. Different sites may have different associated modulation parameters. Rather than having the operator manually input the modes, the controller 1016 may be configured to execute the appropriate instruction based on the selection. In another embodiment, the memory 1032 stores operating modes for different types of treatment. For example, activation may be associated with a different stimulating pressure or frequency range relative to those associated with depressing or blocking tissue function. In a specific example, when the energy application device is an ultrasound transducer, the time-averaged power (temporal average intensity) and peak positive pressure are in the range of 1 mW/cm$^2$-30,000 mW/cm$^2$ (temporal average intensity) and 0.1 MPa to 7 MPa (peak pressure). In one example, the temporal average intensity is less than 35 W/cm$^2$ in the region of interest to avoid levels associated with thermal damage & ablation/cavitation. In another specific example, when the energy application device is a mechanical actuator, the amplitude of vibration is in the range of 0.1 to 10 mm. The selected frequencies may depend on the mode of energy application, e.g., ultrasound or mechanical actuator.

In another embodiment, the memory 1032 stores a calibration or setting mode that permits adjustment or modification of the modulation parameters to achieve a desired result. In one example, the stimulation starts at a lower energy parameter and increases incrementally, either automatically or upon receipt of an operator input. In this manner, the operator may achieve tuning of the induced effects as the modulation parameters are being changed.

The system 1000 may also include an imaging device that facilitates focusing the energy application device 1012. In one embodiment, the imaging device may be integrated with or the same device as the energy application device 1012 such that different ultrasound parameters (frequency, aperture, or energy) are applied for selecting (e.g., spatially selecting) a region of interest and for focusing energy to the selected region of interest for targeting and subsequently neuromodulation. In another embodiment, the memory 1032 stores one or more targeting or focusing modes that is used to spatially select the region of interest within an organ or tissue structure. Spatial selection may include selecting a subregion of an organ to identify a volume of the organ that corresponds to a region of interest. Spatial selection may rely on image data as provided herein. Based on the spatial selection, the energy application device 1012 may be focused on the selected volume corresponding to the region of interest. For example, the energy application device 1012 may be configured to first operate in the targeting mode to apply a targeting mode energy that is used to capture image data to be used for identifying the region of interest. The targeting mode energy is not at levels and/or applied with modulation parameters suitable for preferential activation. However, once the region of interest is identified, the controller 1016 may then operate in a treatment mode according to the modulation parameters associated with preferential activation.

The controller 1016 may also be configured to receive inputs related to the targeted physiological outcomes as an input to the selection of the modulation parameters. For example, when an imaging modality is used to assess a tissue characteristic, the controller 1016 may be configured to receive a calculated index or parameter of the characteristic. Based on whether the index or parameter is above or below a predefined threshold, the modulation parameters may be modified. In one embodiment, the parameter can be a measure of tissue displacement of the affected tissue or a measure of depth of the affected tissue. Other parameters may include assessing a concentration of one or more molecules of interest (e.g., assessing one or more of a change in concentration relative to a threshold or a baseline/control, a rate of change, determining whether concentration is within a desired range). Further, the energy application device 1012 (e.g., an ultrasound transducer) may operate under control of the controller 1016 to a) acquire image data of a tissue that may be used to spatially select a region of interest within the target tissue b) apply the modulating energy to the region of interest and c) acquire image to determine that the targeted physiological outcome has occurred (e.g., via displacement measurement). In such an embodiment, the imaging device, the assessment device 1020 and the energy application device 1012 may be the same device.

In another implementation, a desired modulation parameter set may also be stored by the controller 1016. In this manner, subject-specific parameters may be determined. Further, the effectiveness of such parameters may be assessed over time. If a particular set of parameters is less effective over time, the subject may be developing insensitivity to activated pathways. If the system 10 includes an assessment device 1020, the assessment device 1020 may provide feedback to the controller 1016. In certain embodiments, the feedback may be received from a user or an assessment device 1020 indicative of a characteristic of the target physiological outcome. The controller 1016 may be configured to cause the energy application device to apply the energy according to modulation parameters and to dynamically adjust the modulation parameters based on the feedback. For example, based on the feedback, the processor 1016 may automatically alter the modulation parameters (e.g., the frequency, amplitude, or pulse width of an ultrasound beam or mechanical vibration) in real time and responsive to feedback from the assessment device 1020.

In one example, the present techniques may be used to treat a subject with a metabolic disorder. The present techniques may also be used to regulate blood glucose level in subjects with disorders of glucose regulation. Accordingly, the present techniques may be used to promote homeostasis of a molecule of interest or to promote a desired circulating concentration or concentration range of one or more molecules of interest (e.g., glucose, insulin, glucagon, or a combination thereof). In one embodiment, the present techniques may be used to control circulating (i.e., blood) glucose levels. In one embodiment, the following thresholds may be used to maintain blood glucose levels in a dynamic equilibrium in the normal range:

Fasted:
- Less than 50 mg/dL (2.8 mmol/L): Insulin Shock
- 50-70 mg/dL (2.8-3.9 mmol/L): low blood sugar/hypoglycemia
- 70-110 mg/dL (3.9-6.1 mmol/L): normal
- 110-125 mg/dL (6.1-6.9 mmol/L): elevated/impaired (pre-diabetic)
- 125 (7 mmol/L): diabetic Non-Fasted (Postprandial Approximately 2 Hours after Meal):
- 70-140 mg/dL: Normal
- 140-199 mg/dL (8-11 mmol/L): Elevated or "borderline"/prediabetes
- More than 200 mg/dL: (11 mmol/L): Diabetes For example, the techniques may be used to maintain circulating glucose concentration to be under about 200 mg/dL and/or over about 70 mg/dL. The techniques may be used to maintain glucose in a range between about 4-8 mmol/L or about 70-150 mg/dL. The techniques may be used to maintain a normal blood glucose range for the subject (e.g., a patient), where the normal blood glucose range may be an individualized range based on the patient's individual factors such as weight, age, clinical history. Accordingly, the application of energy to one or more regions of interest may be adjusted in real time based on the desired end concentration of the molecule of interest and may be adjusted in a feedback loop based on input from an assessment device 1020. For example, if the assessment device 1020 is a circulating glucose monitor or a blood glucose monitor, the real-time glucose measurements may be used as input to the controller 16.

The energy application device 1012 may include an ultrasound transducer (e.g., a noninvasive or handheld ultrasound transducer) that is capable of applying energy to a target shown by way of non-limiting example as a liver. The energy application device 1012 may include control circuitry for controlling the ultrasound transducer. The control circuitry of the processor 1030 may be integral to the energy application device 1012 (e.g., via an integrated controller 1016) or may be a separate component. The ultrasound transducer may also be configured to acquire image data to assist with spatially selecting a desired or targeted region of interest and focusing the applied energy on the region of interest of the target tissue or structure based on the acquired image data.

The desired target within a region of interest may be an internal tissue or an organ that includes synapses of axon terminals and non-neuronal cells. The synapses may be stimulated by direct application of energy to the axon terminals within a field of focus of the ultrasound transducer focused on a region of interest of the target to cause release of molecules into the synaptic space. For example, the axon terminal forms a synapse with a liver cell, and the release of neurotransmitters and/or the change in ion channel activity in turn causes downstream effects such as activation of glucose metabolism. In one embodiment, liver stimulation or modulation may refer to a modulation of the region of interest at or adjacent to the porta hepatis.

The energy may be focused or substantially concentrated on a region of interest and to only part of the internal tissue or organ, e.g., less than about 50%, 25%, 10%, or 5% of the total volume of the tissue. In one embodiment, energy may be applied to two or more regions of interest in the target tissue, and the total volume of the two or more regions of interest may be less than about 90%, 50%, 25%, 10%, or 5% of the total volume of the tissue. In one embodiment, the energy is applied to only about 1%-50% of the total volume of the tissue, to only about 1%-25% of the total volume of the tissue, to only about 1%-10% of the total volume of the tissue, or to only about 1%-5% of the total volume of the tissue. In certain embodiments, only axon terminals in the region of interest of the target tissue would directly receive the applied energy and release neurotransmitters while the unstimulated axon terminals outside of the region of interest do not receive substantial energy and, therefore, are not activated/stimulated in the same manner. In some embodiments, axon terminals in the portions of the tissue directly receiving the energy would induce an altered neurotransmitter release. In this manner, tissue subregions may be targeted for neuromodulation in a granular manner, e.g., one or more subregions may be selected. In some embodiments, the energy application parameters may be chosen to induce preferential activation of either neural or non-neuronal components within the tissue directly receiving energy to induce a desired combined physiological effect. In certain embodiments, the energy may be focused or concentrated within a volume of less than about 25 mm$^3$. In certain embodiments, the energy may be focused or concentrated within a volume of about 0.5 mm$^3$-50 mm$^3$. A focal volume and a focal depth for focusing or concentrating the energy within the region of interest may be influenced by the size/configuration of the energy application device 1012. The focal volume of the energy application may be defined by the field of focus of the energy application device 1012.

As provided herein, the energy may be substantially applied only to the region or regions of interest to preferentially activate the synapse in a targeted manner to achieve targeted physiological outcomes and is not substantially applied in a general or a nonspecific manner across the entire tissue.

Technical effects of the disclosed embodiments include the use of the disclosed combined neuromodulation techniques to cause an improvement of ultrasound stimulation treatments. In an embodiment, ultrasound stimulation performed on diabetic patients already on a drug treatment may: 1) permit a decrease of the dose of the current drug they are on (and subsequent side effects), 2) move the patient from a multi-drug to a single drug regimen (with potential monetary savings), or 3) eliminate all drug treatments by using a multi-site ultrasound stimulus instead of drug treatment. Further, the multi-site ultrasound may be started on pre-diabetics (e.g., subjects with insulin resistance) in addition to diet and exercise coaching, in order to prevent the progression to diabetes. This may be done again with infrequent (i.e. monthly or quarterly) ultrasound dosing to provide a boost to their diet/exercise plan.

In addition, single stimulation ultrasound treatment might be performed in conjunction with single drug treatments, such that the two treatments act on overlapping and/or synergistic molecular and/or neural pathways. The treatment of liver ultrasound and GLP agonist compared to dual-site ultrasound treatment as disclosed herein is an exemplar case.

This written description uses examples as part of the disclosure and also to enable any person skilled in the art to practice the disclosed embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A combined neuromodulation treatment method, comprising:
   for a subject having a metabolic disorder, acquiring ultrasound image data of a first region of interest comprising a hepatic or hepatoportal plexus of a liver and a second region of interest comprising a superior mesenteric plexus or a posterior gastric nerve of a gastrointestinal tissue; and
   treating the metabolic disorder by:
      focusing first ultrasound energy pulses to the hepatic or hepatoportal plexus; and
      focusing second ultrasound energy pulses to the superior mesenteric plexus or posterior gastric nerve.

2. The method of claim 1, wherein the metabolic disorder is diabetes.

3. The method of claim 1, wherein the metabolic disorder is type II diabetes.

4. The method of claim 1, wherein the metabolic disorder is obesity or insulin resistance.

5. The method of claim 1, comprising receiving feedback from an assessment device indicative of a circulating glucose concentration after a plurality of ultrasound doses.

6. The method of claim 5, comprising receiving a pre-treatment circulating glucose concentration of the subject, wherein the circulating glucose concentration after the plurality of ultrasound doses is lower than the pre-treatment circulating glucose concentration.

7. The method of claim 1, wherein applying the first ultrasound energy pulses and applying the second ultrasound energy pulses are separated by less than one hour.

8. The method of claim 1, comprising repeating applying the first ultrasound energy pulses to the first region of interest and the second ultrasound energy pulses to the second region of interest once daily for a plurality of days to treat the metabolic disorder.

9. The method of claim 1, comprising repeating applying the first ultrasound energy pulses to the first region of interest and the second ultrasound energy pulses to the second region of interest at least once a month to treat the metabolic disorder, wherein the metabolic disorder is pre-diabetes or insulin resistance.

10. The method of claim 1, wherein the second ultrasound energy pulses are applied at a different time relative to the first ultrasound energy pulses.

11. The method of claim 1, wherein the second ultrasound energy pulses are applied contemporaneously relative to the first ultrasound energy pulses.

12. A combined neuromodulation treatment method, comprising:
   for a subject having a metabolic disorder, acquiring ultrasound image data of a first region of interest comprising a hepatic or hepatoportal plexus of a liver and a second region of interest comprising a superior mesenteric plexus or a posterior gastric nerve of a gastrointestinal tissue; and
   treating the metabolic disorder by:
      focusing first ultrasound energy pulses to the hepatic or hepatoportal plexus to neuromodulate an ascending glucose sensor afferent pathway; and
      focusing second ultrasound energy pulses to the superior mesenteric plexus or posterior gastric nerve to neuromodulate a neuroendocrine field.

13. A combined neuromodulation system, comprising:
   an energy application controller in communication with an ultrasound probe, wherein the energy application controller is configured to:
      for a subject having a metabolic disorder, acquire ultrasound image data of a first region of interest comprising a hepatic or hepatoportal plexus of a liver and a second region of interest comprising a superior mesenteric plexus or a posterior gastric nerve of a gastrointestinal tissue; and
      treat the metabolic disorder by:
         focusing first ultrasound energy pulses to the hepatic or hepatoportal plexus; and
         focusing second ultrasound energy pulses to the superior mesenteric plexus or posterior gastric nerve.

14. The combined neuromodulation system of claim 13, comprising receiving feedback from an assessment device indicative of a circulating glucose concentration after a plurality of ultrasound doses.

15. The combined neuromodulation system of claim 14, comprising receiving a pre-treatment circulating glucose concentration of the subject, wherein the circulating glucose concentration after the plurality of ultrasound doses is lower than the pre-treatment circulating glucose concentration.

16. The combined neuromodulation system of claim 15, wherein applying the first ultrasound energy pulses and applying the second ultrasound energy pulses are separated by less than one hour.

17. A non-transitory computer-readable medium comprising computer-executable instructions that, when executed by at least one processor, are configured to cause the at least one processor to perform operations comprising:
   for a subject having a metabolic disorder, acquiring, via an ultrasound probe, ultrasound image data of a first region of interest comprising a hepatic or hepatoportal plexus of a liver and a second region of interest comprising a superior mesenteric plexus or a posterior gastric nerve of a gastrointestinal tissue; and
   treating the metabolic disorder by:
      focusing, via the ultrasound probe, first ultrasound energy pulses to the hepatic or hepatoportal plexus; and
      focusing, via the ultrasound probe, second ultrasound energy pulses to the superior mesenteric plexus or posterior gastric nerve.

18. A combined neuromodulation system, comprising:
   an energy application controller in communication with an ultrasound probe, wherein the energy application controller is configured to:
      for a subject having a metabolic disorder, acquire ultrasound image data of a first region of interest comprising a hepatic or hepatoportal plexus of a liver and a second region of interest comprising a superior mesenteric plexus or a posterior gastric nerve of a gastrointestinal tissue; and
      treat the metabolic disorder by:

focusing first ultrasound energy pulses to the hepatic or hepatoportal plexus to neuromodulate an ascending glucose sensor afferent pathway; and focusing second ultrasound energy pulses to the superior mesenteric plexus or posterior gastric nerve to neuromodulate a neuroendocrine field.

19. The combined neuromodulation system of claim 18, wherein the metabolic disorder is diabetes.

20. The combined neuromodulation system of claim 18, comprising receiving feedback from an assessment device indicative of a circulating glucose concentration after a plurality of ultrasound doses.

21. The combined neuromodulation system of claim 18, wherein applying the first ultrasound energy pulses and applying the second ultrasound energy pulses are separated by less than one hour.

22. The combined neuromodulation system of claim 18, comprising repeating applying the first ultrasound energy pulses to the first region of interest and the second ultrasound energy pulses to the second region of interest once daily for a plurality of days to treat the metabolic disorder.

23. The combined neuromodulation system of claim 18, comprising repeating applying the first ultrasound energy pulses to the first region of interest and the second ultrasound energy pulses to the second region of interest at least once a month to treat the metabolic disorder, wherein the metabolic disorder is pre-diabetes or insulin resistance.

24. A non-transitory computer-readable medium comprising computer-executable instructions that, when executed by at least one processor, are configured to cause the at least one processor to perform operations comprising:

for a subject having a metabolic disorder, acquiring, via an ultrasound probe, ultrasound image data of a first region of interest comprising a hepatic or hepatoportal plexus of a liver and a second region of interest comprising a superior mesenteric plexus or a posterior gastric nerve of a gastrointestinal tissue; and treating the metabolic disorder by:
focusing, via the ultrasound probe, first ultrasound energy pulses to the hepatic or hepatoportal plexus to neuromodulate an ascending glucose sensor afferent pathway; and
focusing, via the ultrasound probe, second ultrasound energy pulses to the superior mesenteric plexus or posterior gastric nerve to neuromodulate a neuroendocrine field.

* * * * *